(12) United States Patent
Ide

(10) Patent No.: US 7,099,526 B2
(45) Date of Patent: Aug. 29, 2006

(54) OPTICAL SWITCH

(75) Inventor: Masafumi Ide, Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 19 days.

(21) Appl. No.: 10/502,735

(22) PCT Filed: Feb. 28, 2003

(86) PCT No.: PCT/JP03/02299

§ 371 (c)(1),
(2), (4) Date: Jul. 28, 2004

(87) PCT Pub. No.: WO03/075080

PCT Pub. Date: Sep. 12, 2003

(65) Prior Publication Data

US 2005/0089265 A1    Apr. 28, 2005

(30) Foreign Application Priority Data

Mar. 5, 2002   (JP)   ............................. 2002-058970

(51) Int. Cl.
*G02B 6/26* (2006.01)
(52) U.S. Cl. ........................................ 385/16; 359/483
(58) Field of Classification Search .................... None
See application file for complete search history.

(56) References Cited

U.S. PATENT DOCUMENTS 6,331,910 B1 * 12/2001 Dultz et al. .................. 359/246

2002/0009257 A1   1/2002 Bouevitch et al.
2003/0021519 A1 * 1/2003 Zalevsky et al. ............. 385/16

FOREIGN PATENT DOCUMENTS

JP    11-218752    8/1999
JP    2000-206576  7/2000

* cited by examiner

*Primary Examiner*—Sung Pak
(74) *Attorney, Agent, or Firm*—Westerman, Hattori, Daniels & Adrian, LLP.

(57) ABSTRACT

An optical switch, which makes an optical path length or optical characteristics equal among polarized lights passing through different paths, eliminates the need for the optical path and the optical characteristics to be adjusted, reduces the signal deterioration, and improves the operation speed. The optical switch includes polarized light separation/combination means (1); at least two reflection means (2); and polarization control means (3) for controlling the polarization direction. The polarized light separation/combination means (1) and the reflection means (2) are arranged in such a manner that the two polarized components, separated by the polarized light separation/combination means (1), travel through the same optical path in different directions, re-enter the polarized light separation/combination means (1), and combined. At the same time, the polarization control means (3) is provided in the optical path to cause the polarization control means (3) to control the polarization direction of each polarization component.

19 Claims, 25 Drawing Sheets

OPTICAL SWITCH

TECHNICAL FIELD

The present invention relates to an optical switch that switches the optical path, and more particularly to a switch that switches the optical path using a change in the arrangement state of liquid crystal molecules.

BACKGROUND ART

To configure an optical network using optical fibers in an optical communication field, an optical switch that switches between an incoming light and an outgoing light is necessary. In this optical fiber communication, for example, the 1.55 µm band or 1.3 µm band is used for a long-distance transmission, and the 850 nm band for a short-distance transmission.

As this type of optical switch, a crossbar type 2×2 optical changeover switch having a configuration, in which the incoming/outgoing ends of a light are provided in the linear direction (for example, Japanese Patent Laid-Open Publication No. Hei 2-100025), and a 2×2 optical changeover switch having a configuration, in which the incoming/outgoing ends of a light are provided at a right angle, are conventionally known.

A crossbar type 2×2 optical changeover switch has two sets of polarizing beam splitter to which one pair of optical fibers is connected through a collimator lens with a liquid crystal cell sandwiched between the polarizing beam splitters. This crossbar type 2×2 optical changeover switch selectively switches a light, which enters from the optical fiber of one polarizing beam splitter, and outputs the light from the optical fiber of the other polarizing beam splitter according to whether or not a voltage is applied to the liquid crystal cell.

FIG. 25 shows the configuration of an example of a 2×2 optical changeover switch in which the incoming end and the outgoing end of a light are arranged at a right angle.

Referring to FIG. 25(a), a 2×2 optical changeover switch has two optical elements on the two sides that are at aright angle to a polarizing beam splitter 101: an optical element composed of a liquid crystal cell 103 and a light reflector 105, and an optical element composed of a liquid crystal cell 104 and a light reflector 106. An optical fiber 109 is connected via a collimator 107 to the side, opposed to the liquid crystal cell 103, with the polarizing beam splitter 101 between them, and an optical fiber 110 is connected via a collimator 108 to the side, opposed to the liquid crystal cell 104, with the polarizing beam splitter 101 between them. Because light enters and exits from the optical fibers 109 and 110, circulators 111 and 112 are connected to the optical fibers 109 and 110 to separate an incoming light from an outgoing light. A voltage is applied to the liquid crystal cells 103 and 104 to change the polarization state of an incoming light by $\lambda/4$ wavelength. In this configuration, the crystal cells are combined with the light reflectors to change the polarization state by $\lambda/2$ wavelength by adding up the changes in the polarization state of both an incoming light and an outgoing light.

A 2×2 optical changeover switch having this configuration can execute two types of switching operation states: an exchanging operation state in which the incoming end and the outgoing end are different and a straight operation state in which the incoming end and the outgoing end are the same. The polarizing beam splitter 101 has a polarized light separation/combination film 102.

FIG. 25(b) is a diagram showing the exchanging state. In this operation state, no voltage is applied to the liquid crystal cell 103 and the liquid crystal cell 104. A light entering from the optical fiber 109 is composed of two polarization components p and s whose polarization planes are at a right angle. After changed to parallel beams by the collimator 107, the light enters the polarizing beam splitter 101 where it is separated by the polarized light separation/combination film 102 into the polarization component p that goes straight and the polarization component s that reflects.

When no voltage is applied to the liquid crystal cell 103 and the liquid crystal cell 104, the polarization state is changed by the liquid crystal cell 103 and the liquid crystal cell 104. In FIG. 25(b), ON indicates that the polarization state is changed. The polarization component p, which goes straight, passes through the liquid crystal cell 103 where the polarization state is changed by $\lambda/4$ wavelength, is reflected by the light reflector 105, and passes through the liquid crystal cell 103 again. At this time, the polarization state is further changed by $\lambda/4$ wavelength and the incoming polarization component p is changed to the polarization component s. The changed polarization component s is reflected by the polarized light separation/combination film 102 and is output to the optical fiber 110 via the collimator 108. On the other hand, the polarization component s that is reflected by the polarized light separation/combination film 102 passes through the liquid crystal cell 104 where the polarization state is changed by $\lambda/4$ wavelength, is reflected by the light reflector 106, and passes through the liquid crystal cell 104 again. At this time, the polarization state is further changed by $\lambda/4$ wavelength and the incoming polarization component s is changed to the polarization component p. The changed polarization component p passes through the polarized light separation/combination film 102 and is output to the optical fiber 110 via the collimator 108. In this way, the incoming light exits from the end different from the incoming end.

FIG. 25(c) is a diagram showing the straight state. In this operation state, a voltage is applied to the liquid crystal cell 103 and the liquid crystal cell 104. When a voltage is applied to the liquid crystal cell 103 and the liquid crystal cell 104, the liquid crystal cell 103 and the liquid crystal cell 104 do not change the polarization state. In FIG. 25(c), OFF indicates that the polarization state is not changed.

The polarization component p, which goes straight, passes through the liquid crystal cell 103, with the polarization state unchanged, is reflected by the light reflector 105, and passes through the liquid crystal cell 103 again with the polarization state unchanged. After reflected, the polarization component p passes through the liquid crystal cell 103, goes straight through the polarized light separation/combination film 102, and is output to the optical fiber 109 via the collimator 107. On the other hand, the polarization component s, which is reflected by the polarized light separation/combination film 102, passes through the liquid crystal cell 104 with the polarization state unchanged and, after that, is reflected by the light reflector 106 and passes through the liquid crystal cell 104 again with the polarization state unchanged. After reflected, the polarization component s that passes through the liquid crystal cell 104 is reflected by the polarized light separation/combination film 102 and is output to the optical fiber 109 via the collimator 107. This causes the incoming light to be output from the end that is the same as the incoming end.

The configuration of the 2×2 optical changeover switch described above and the configuration of an add drop multiplexer using the 2×2 optical changeover switch are described, for example, in Optical-Engineering, Vol. 40 No.

8, 1521–1528, August 2001 (Sarun Sumriddetchakajorn, Nabeel A. Riza, Deepak K. Sengupta).

It is required that the function of an optical switch be symmetrical when the incoming light and the outgoing light are exchanged. When the incoming light and the outgoing light are exchanged in the configuration of the 2×2 optical changeover switch described above, the function is not always symmetrical because the optical path, liquid crystal cells through which the light passes, and the optical system may differ according to the polarization component in the optical switch. The problem is that, in order to make the function symmetrical when the incoming light and the outgoing light are exchanged, the optical path lengths must be made equal or the characteristics of the liquid crystal cells and the optical system must be adjusted. Because more adjustment is required as the configuration requires more parts, this problem becomes more serious and affects the manufacturing cost.

A Polarization Dependent Loss (PDL) and a Polarization Mode Dispersion (PMD) are known as a loss generated by an optical signal. The polarization dependent loss is generated, for example, when the signal is transmitted through the electrodes provided on the liquid crystal cell and the signal strength is weakened. In the configuration in which the light passes through liquid crystal cells many times, the problem is that the polarization dependent loss becomes large. The problem with the polarization mode dispersion is that, because the level of optical pulse dispersion differs according to the polarization modes of components at a right angle, different-length optical paths increase the signal deterioration caused by this optical dispersion.

In addition, in a configuration in which the polarization state is switched by a liquid crystal cell, the switching speed depends on the switching speed of the liquid crystal cell. Because the switching speed of this liquid crystal cell is proportional to the square of the thickness of the liquid crystal cell, a thinner liquid crystal cell is desirable. Another problem is that, because the thickness of the liquid crystal cell depends on the polarization angle to be changed and the wavelength of the light, the high-speed operation is difficult.

To solve the prior-art problems, it is an object of the present invention to eliminate the need for the adjustment of the optical path length or the optical characteristic and to reduce signal deterioration due to the polarization mode dispersion by making the optical path length and the optical characteristics equal for the polarized lights that pass through different paths. It is another object of the present invention to reduce the polarization dependent loss by reducing the number of times the light passes through the electrode of a liquid crystal cell and to reduce the cost by using a configuration in which the number of parts and adjustment points is decreased or reduced. It is still another object of the present invention to increase the operation speed of an optical switch by increasing the response of a liquid crystal cell.

DISCLOSURE OF THE INVENTION

An optical switch according to the present invention comprises polarized light separation/combination means; at least two reflection means; and polarization control means for controlling a polarization direction, wherein the polarized light separation/combination means and the reflection means are arranged so that two polarization components, separated by the polarized light separation/combination means, travel along the same optical path but into different traveling directions, re-enter the polarized light separation/combination means, and are combined therein and, at the same time, the polarization control means is placed in the optical path to cause the polarization control means to control the polarization direction of each polarization component.

The polarization control means, placed in the optical path, performs polarization control of a total of $\lambda/2$ wavelength in the optical path. The optical path formed by the reflection means and the polarized light separation/combination means forms a polygon. This polygon is arranged so that it has a right angle at an interior angle corresponding to the polarized light separation/combination means and so that an angle calculated by multiplying a number of reflection means minus 1 multiplied by 180 degrees equals a sum of the interior angles of the polygon.

The optical switch according to the present invention, which comprises polarized light separation/combination means, at least two reflection means, and polarization control means, allows two polarization components, separated by the polarized light separation/combination means, to travel along the same optical path but into different traveling directions, to re-enter the polarized light separation/combination means, and to be combined therein. The two polarization components pass through the same polarization control means in the same optical path. This means that, because the polarization components pass through the same optical path that is actually used as different paths, the optical path lengths are equal and the optical characteristics of the optical path, through which the components pass, are equal. Therefore, this configuration eliminates the need for adjusting the optical path length and the optical characteristics and the signal deterioration due to polarization mode dispersion is reduced.

The conventional configuration requires polarized light separation/combination means for each path according to the polarization component. On the other hand, the optical switch according to the present invention, which has one polarization control means placed in the same optical path in order to change polarization, reduces the number of times the polarization component passes through the polarization control means and therefore reduces the polarization dependent loss. In addition, one polarization control means placed in the same optical path reduces or decreases the number of parts and adjustment points and therefore reduces the cost.

In a configuration where the polarization control means is composed of a liquid crystal cell, the number of liquid crystal cells placed in the optical path can be increased, for example, by placing them on the reflection means. This configuration makes each liquid crystal cell thinner and therefore improves the operation speed of the optical switch.

The optical switch according to the present invention can be configured in various modes in which two polarization components travel along the same optical path but into different traveling directions and re-enter the polarized light separation/combination means and in which the polarization control means is placed in the optical path.

In one embodiment of the arrangement of the reflection means, the reflection means are placed symmetrically with respect to the polarized light separation/combination means so that the two light reflectors make an incoming angle and an outgoing angle of the polarization component become 22.5 degrees. This forms the same path that is actually different paths.

In the arrangement configuration of the light reflectors, one embodiment of the arrangement of the polarization control means is that the polarization control means, which performs polarization control of $\lambda/4$ wavelength, is placed in the optical path in front of one of two light reflectors. One embodiment of the arrangement of the polarization control means is that the polarization control means, which performs polarization control of λ/8 wavelength, is placed in the optical path in front of both light reflectors.

This arrangement of the polarization control means allows polarization components to travel along the same path that is actually different paths, thus making it possible to perform the same polarization control for any polarization component.

In another embodiment of the arrangement of the reflection means, the reflection means are arranged in such a way that two light reflectors are placed symmetrically with respect to the polarized light separation/combination means so that an incoming angle and an outgoing angle of a polarization component become 45 degrees and one light reflector is arranged in such a way that it is in an optical path connecting the two light reflectors and which is placed vertically to the light reflectors.

In the arrangement configuration of the light reflectors, one embodiment of the arrangement of the polarization control means is that the polarization control means, which performs polarization control of λ/4 wavelength, is placed in the optical path in front of either one light reflector that is placed in the vertical direction or the two light reflectors that are arranged in parallel. Another embodiment of the arrangement of the polarization control means is that the polarization control means, which performs polarization control of λ/12 wavelength, is placed in the optical path in front of each of three light reflectors.

In another embodiment of the arrangement of the reflection means and the polarization control means, the reflection means comprises two light reflectors placed symmetrically with respect to the polarized light separation/combination means so that an incoming angle and an outgoing angle of a polarization component become 22.5 degrees and wherein the polarization control means that performs polarization control of λ/2 wavelength is placed in the optical path between the two light reflectors. In still another embodiment of the arrangement of the reflection means and the polarization control means, the reflection means comprises two light reflectors placed symmetrically with respect to the polarized light separation/combination means so that an incoming angle and an outgoing angle of a polarization component become 22.5 degrees and wherein the polarization control means that performs polarization control of λ/10 wavelength is placed in the optical path in front of the two light reflectors and in the optical path between the two polarization control means.

This arrangement of the reflection means and the polarization control means allows polarization components to travel along the same path that is actually different paths, thus making it possible to perform the same polarization control for any polarization component.

In the optical switch according to the present invention, the polarization control means is configured by a liquid crystal cell. A liquid crystal cell is used not only as a liquid crystal cell for switching that changes the polarization status of an s-polarized light and a p-polarized light by 90 degrees according to the polarization angle to control the transmission and reflection of a light through the polarized light separation/combination means but also as a liquid crystal cell for residual birefringence compensation that compensates for a polarization status shift according to a path that is caused by a residual birefringence remaining in a liquid crystal or in a polarization plate placed in an optical path. To compensate for a residual birefringence, either the director direction of the liquid crystal cell for residual birefringence compensation is set at a right angle to the director direction of the liquid crystal cell for switching and a voltage is applied to nullify the double refraction amount of both liquid crystal cells or a double refraction crystal or an isotropic film is placed in the optical path.

A liquid crystal cell can be configured in various ways. One of the configurations is that a liquid crystal cell is provided with a light reflector to configure reflection means.

One embodiment of the liquid crystal cell configuration in which the light reflector is provided, the light reflector is placed inside the liquid crystal cell. In this configuration, one of two electrodes of the liquid crystal cell may be a light reflector. In another embodiment, the light reflector is placed outside the liquid crystal cell.

One embodiment of configuring a 2-input/2-output switch with the optical switch of the present invention is that an input/output port is placed at both ends of the optical path of the optical switch of the present invention with the optical axis adjusted and a circulator is connected to this input/output port.

In another embodiment, two input/output ports are placed at both ends of the optical path of the optical switch of the present invention symmetrically with respect to an optical center of the optical path and with an optical axis adjusted. This configuration allows the optical switch of the present invention to be configured as a 2-input/2-output switch without a circulator. The optical switch of the present invention can also be configured as a circulator.

The optical switch of the present invention can also be used as a component of an Add/Drop device. In addition to the switching or the residual birefringence compensation described above, the optical switch can also-be used for temperature compensation or as an attenuator by controlling the polarization status.

BRIEF DESCRIPTION OF THE DRAWINGS

FIG. 9 is a diagram showing an example of a seventh configuration based on the basic configuration of the optical switch of the present invention and its operation state;

BEST MODE FOR CARRYING OUT THE INVENTION

An optical switch in the best mode for carrying out the present invention will be described below with reference to the drawings.

Figure 1:
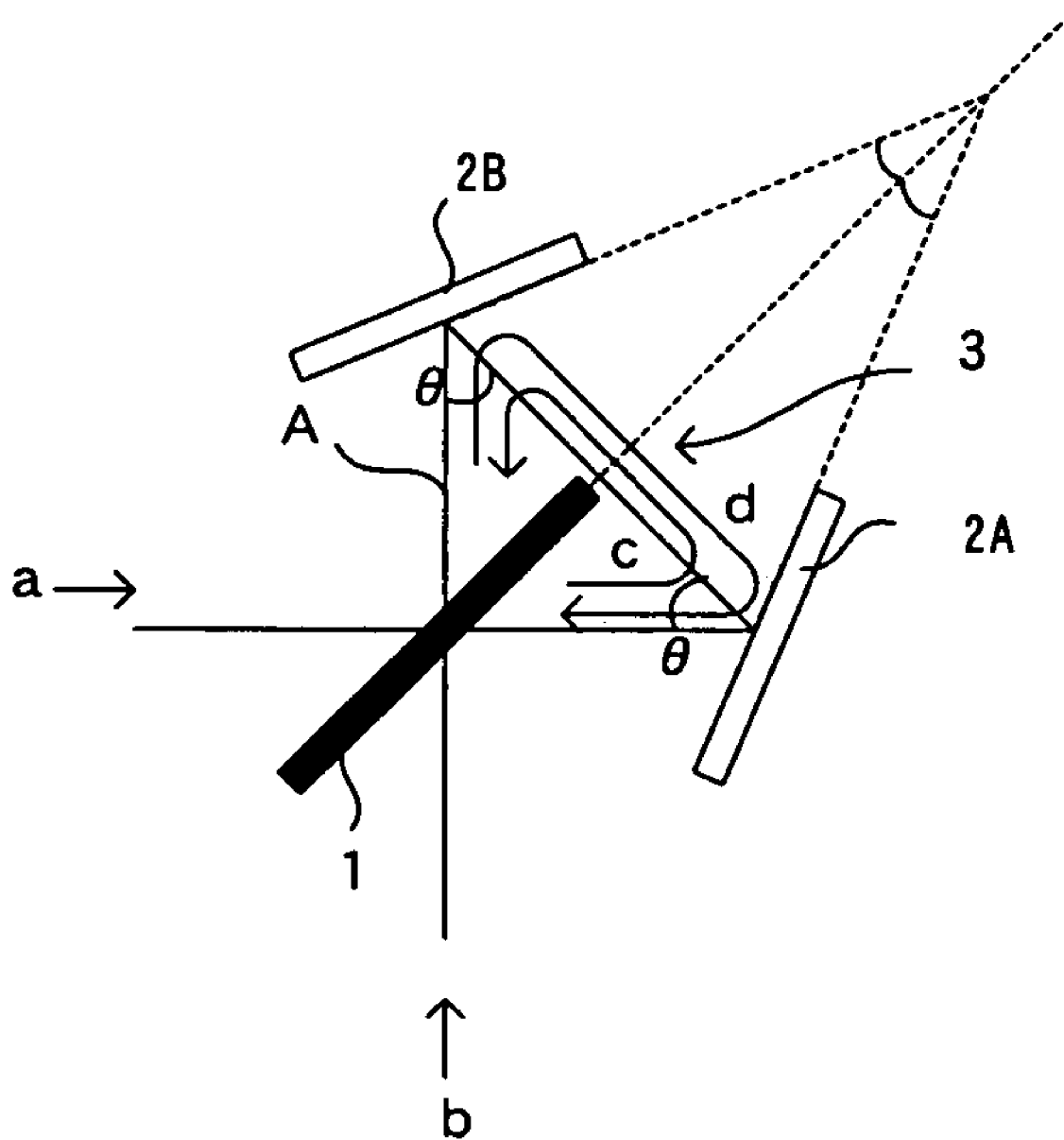
FIG. 1 is a general diagram showing the basic configuration of an optical switch of the present invention.

FIG. 1 is a general diagram showing the basic configuration of the optical switch of the present invention. Referring to FIG. 1, the optical switch of the present invention comprises polarized light separation/combination means 1; at least two reflection means 2 (2A, 2B); and polarization control means 3 that controls the polarization direction. The polarized light separation/combination means 1, which separates an incoming light into the p-polarization component and the s-polarization component, allows the p-polarization component to go straight and reflects the s-polarization component.

The reflection means 2 (2A and 2B) are arranged so that the two polarization components, separated by the polarized light separation/combination means 1, go along the same optical path but in different directions and re-enter the polarized light separation/combination means 1. The triangle indicated by A in the figure indicates an optical path formed by the polarized light separation/combination means 1 and reflection means 2A and 2B. For a light entering from the direction indicated by a in the figure, two paths are formed; path c along which the light goes straight through the polarized light separation/combination means 1, is reflected by the reflection means 2A and the reflection means 2B in this order, and then returns to the polarized light separation/combination means 1; and path d along which the light is reflected by the polarized light separation/combination means 1, is reflected by the reflection means 2B and the reflection means 2A in this order, and then returns to the polarized light separation/combination means 1. Paths c and d are the same optical path. For a light entering from the direction indicated by b in the figure, two paths c and d are the same optical path because the polarized light separation/combination means 1 and reflection means 2A and 2B are optically symmetrical.

The polarization control means 3, which controls the polarization state, is arranged in this optical path. The polarization control means 3 may be arranged in one of many positions on the optical path.

This configuration allows different paths to have an equal length and allows those paths to use the same optical elements on the optical path, such as reflection means and polarization control means, through which a light passes.

The polarized light separation/combination means 1 can be formed by a polarized light separation/combination film, and the polarization control means can be formed by a liquid crystal cell.

Next, some configuration examples of the basic configuration of the optical switch according to the present invention, as well as the operation state in the examples of the configuration, will be described with reference to FIGS. 2, 3, and 6–10.

Figure 2:
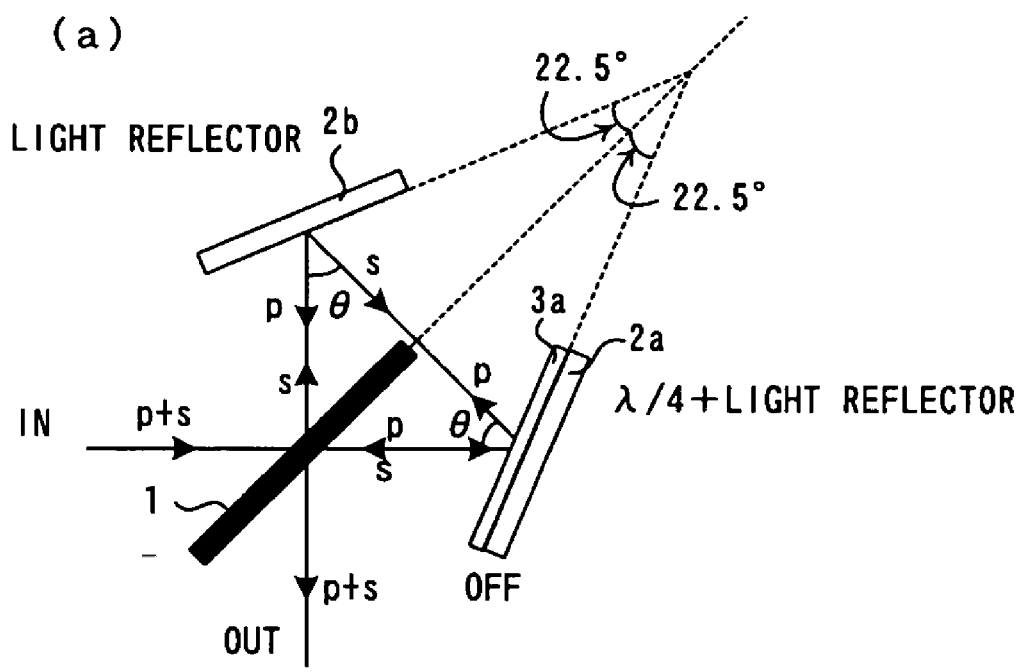
FIG. 2 is a diagram showing an example of a first configuration based on the basic configuration of the optical switch of the present invention and its operation state.
Figure 2:
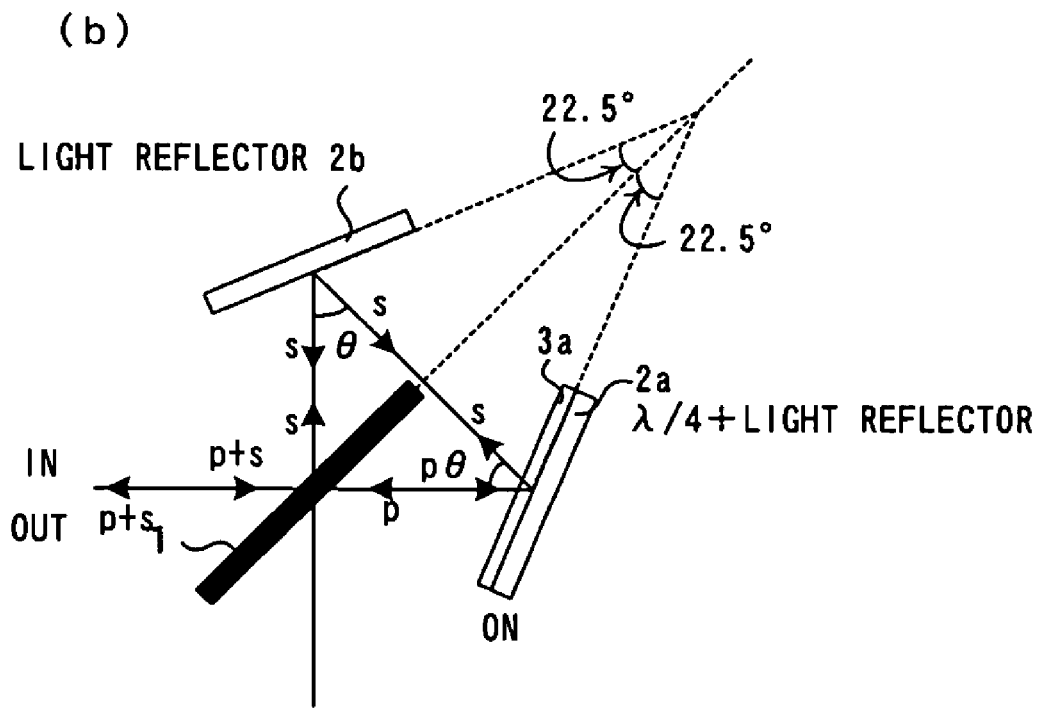

A first configuration example will be described with reference to FIG. 2. In the first configuration example, the two light reflectors 2a and 2b are arranged in positions that are symmetrical with respect to the polarized light separation/combination means 1 so that the incoming angle and the outgoing angle of the polarization components become 22.5 degrees. In the figure, the incoming angle and the outgoing angle are indicated by θ. In this configuration example, polarization control means 3a, which performs polarization control of λ/4 wavelength, is placed in the optical path of one of light reflectors 2a and 2b that is in front of the light reflector (although placed in front of the light reflector 2a in the figure, the polarization control means may also be placed in front of the light reflector 2b).

FIG. 2(a) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure), composed of two polarization components p and s whose polarization planes are at a right angle, is changed to parallel beams by a collimator not shown and is separated by the polarized light separation/combination means 1 into the polarization component p that goes straight and the polarization component s that reflects.

Because the polarization control means 3a does not change polarization in this operation state, the polarization component p that goes straight passes through the polarization control means 3a with the polarization state unchanged. After that, the polarization component is reflected by the light reflector 2a and passes through the polarization control means 3a again. At this time, the polarization state does not change but the polarization component is still the polarization component p. The polarization component p is further reflected by the light reflector 2b and reaches the polarized light separation/combination means 1 again. At this time, the polarization component p travels in the direction at a right angle to the incoming direction. This polarization component p goes straight through the polarized light separation/combination means 1 and exits from the outgoing end, indicated by OUT in the figure, via a collimator not shown.

On the other hand, the polarization component s that reflects on the polarized light separation/combination means 1 is reflected by the light reflector 2b. After passing through the polarization control means 3a with the polarization state unchanged, the polarization component is reflected by the light reflector 2a and passes through the polarization control means 3a again. At this time, the polarization state does not change and therefore the polarization component is still the polarization component s. The polarization component s reaches the polarized light separation/combination means 1 again and is reflected. The direction of reflection in this case is at a right angle to the incoming direction and the polarization component exits from the outgoing end, indicated by OUT in the figure, via a collimator not shown. This causes the incoming light to exit from the end different from the incoming end.

FIG. 2(b) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3a changes polarization in this operation state, the polarization component p that goes straight passes through the polarization control means 3a with the wavelength changed by λ/4. After that, the polarization component is reflected by the light reflector 2a and passes through the polarization control means 3a again with the wavelength changed by λ/4 and is changed to the polarization component s. The polarization component s is further reflected by the light reflector 2b and reaches the polarized light separation/combination means 1 again. At this time, the polarization component s travels in the direction at a right angle to the incoming direction. This polarization component s is reflected by the polarized light separation/combination means 1 and exits from the outgoing end OUT, which is the same as the incoming end, via a collimator not shown.

On the other hand, the polarization component s that reflects on the polarized light separation/combination means 1 is reflected by the light reflector 2b. Next, the polarization component passes through the polarization control means 3a with the wavelength changed by λ/4, is reflected by the light reflector 2a, passes through the polarization control means 3a again with the wavelength changed by λ/4, and is changed to the polarization component p. The polarization component p reaches the polarized light separation/combination means 1 again and goes straight through it. The direction of reflection in this case is the opposite of the incoming direction, and the polarization component exits from the outgoing end OUT, which is the same as the incoming end, via a collimator not shown. This causes the incoming light to exit from the end that is the same as the incoming end.

Figure 3:
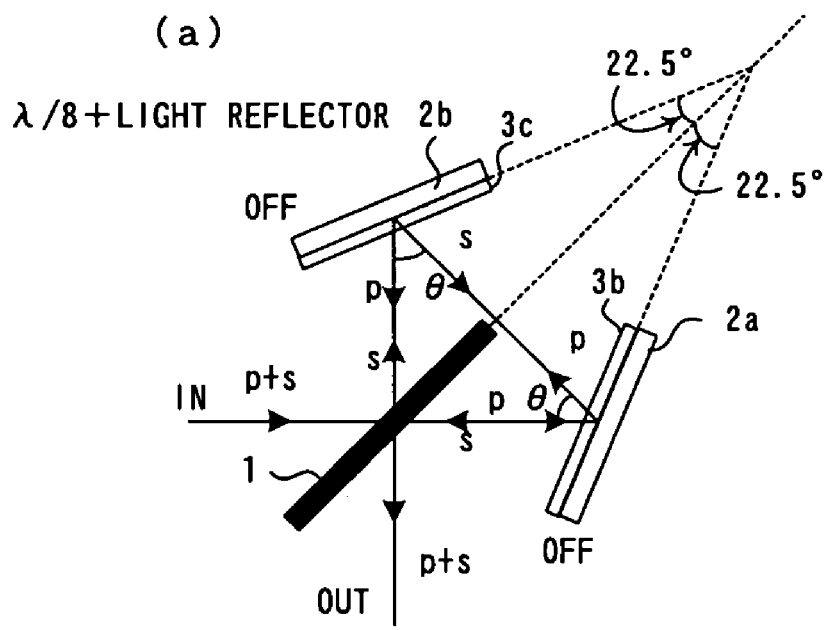
FIG. 3 is a diagram showing an example of a second configuration based on the basic configuration of the optical switch of the present invention and its operation state.
Figure 3:
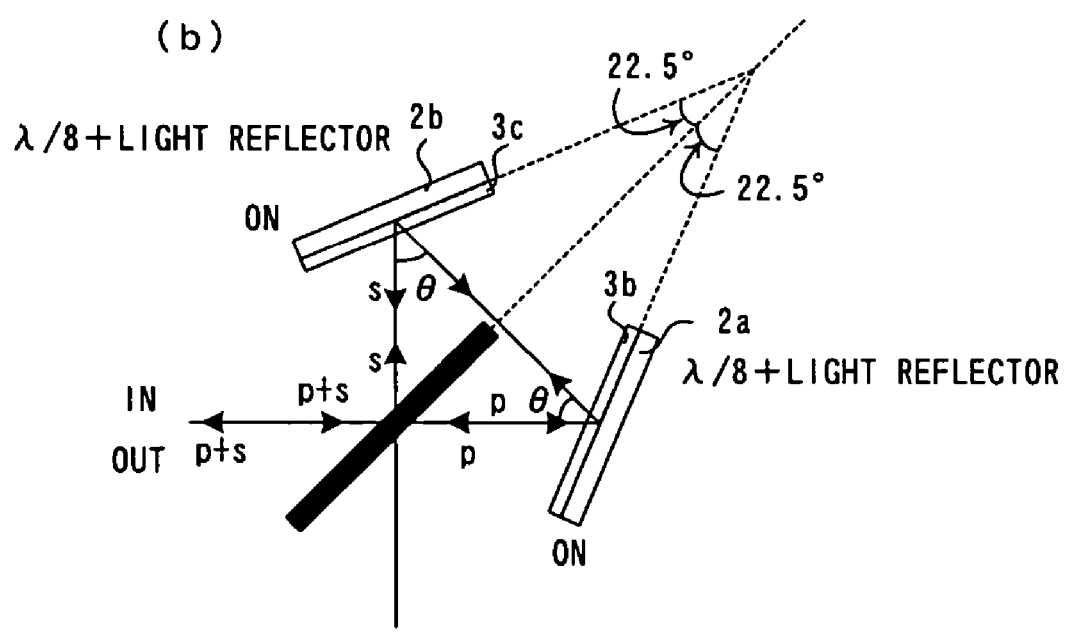

A second configuration example will be described with reference to FIG. 3. In the second configuration example, the two light reflectors 2a and 2b are arranged in positions that are symmetrical with respect to the polarized light separation/combination means 1 so that the incoming angle and the outgoing angle of the polarization components become 22.5 degrees. In the figure, the incoming angle and the outgoing angle are indicated by θ. In this configuration example, polarization control means 3b and 3c, each of which performs polarization control of λ/4 wavelength, are each placed in the optical paths in front of the two light reflectors 2a and 2b.

FIG. 3(a) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3b does not change polarization in this operation state, the polarization component p that goes straight passes through the polarization control means 3b with the polarization state unchanged. After that, the polarization component is reflected by the light reflector 2a and passes through the polarization control means 3b again. At this time, the polarization component is still the polarization component p with polarization state unchanged. The polarization component p is further reflected by the light reflector 2b and, at the same time, passes the polarization control means 3c twice. However, because the polarization control means 3c does not change polarization, the polarization component p remains unchanged. The polarization component p, reflected by the light reflector 2b, reaches the polarized light separation/combination means 1 again. At this time, the polarization component p travels in the direction at a right angle to the incoming direction. This polarization component p goes straight through the polarized light separation/combination means 1 and exits from the outgoing end, indicated by OUT in the figure, via a collimator not shown.

On the other hand, the polarization component s that reflects on the polarized light separation/combination means 1 passes through the polarization control means 3c with the polarization state unchanged because the polarization control means 3c does not change polarization in this operation state. After that, the polarization component is reflected by the light reflector 2b and passes through the polarization control means 3c again. At this time, the polarization component is still the polarization component s with the polarization state unchanged. The polarization component s is further reflected by the light reflector 2a and, at the same time, passes through the polarization control means 3b twice. However, because the polarization control means 3b does not change polarization, the polarization component s remains unchanged. The polarization component s, reflected by the light reflector 2a, reaches the polarized light separation/combination means 1 again, is reflected, and exits from the outgoing end, indicated by OUT in the figure, via a collimator not shown. This causes the incoming light to exit from the end different from the incoming end.

FIG. 3(b) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3b changes polarization in this operation state, the polarization component p that goes straight passes through the polarization control means 3b with the wavelength changed by λ/8. After that, the polarization component is reflected by the light reflector 2a and passes through the polarization control means 3b again with the wavelength changed by λ/8. The total wavelength change becomes λ/4. The polarization component whose wavelength is changed by λ/4 is further reflected by the light reflector 2b, its wavelength is changed by λ/8 twice as the polarization component passes through the polarization control means 3c twice, and the total wavelength change becomes λ/4. This causes the polarization component p to change to the polarization component s. The changed polarization component s reaches the polarized light separation/combination means 1 again. This polarization component s is reflected by the polarized light separation/combination means 1 and exits from the outgoing end OUT, which is the same as the incoming end, via a collimator not shown.

On the other hand, the polarization component s that reflects on the polarized light separation/combination means 1 passes through the polarization control means 3c twice with the wavelength changed by λ/4 while it is reflected by the light reflector 2b. In addition, the polarization component s passes through the polarization control means 3b twice with the wavelength changed by λ/4 while it is reflected by the light reflector 2a and is changed to the polarization component p. The polarization component p reaches the polarized light separation/combination means 1 again and passes straight through it. The traveling direction at this time is the reverse of the incoming direction and the light exits from the outgoing end OUT, which is the same as the incoming end, via a collimator not shown. This causes the incoming light to exit from the same end as the incoming end.

Figure 4:
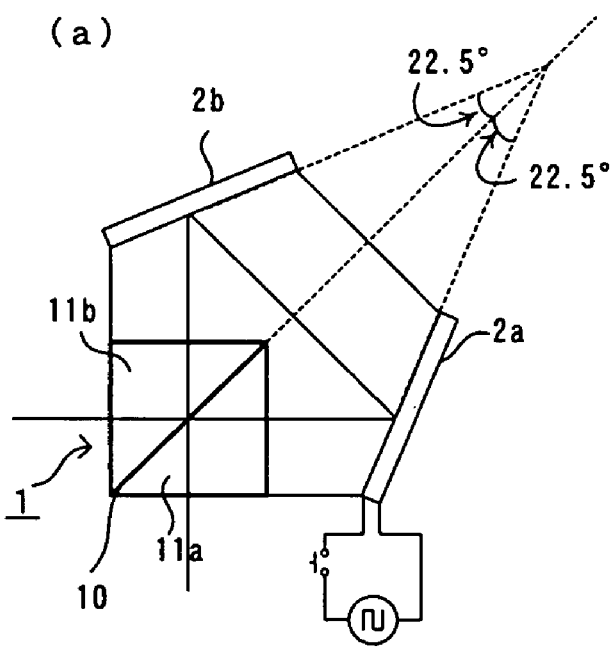
FIG. 4 is a diagram showing the arrangement of the first and second configuration examples of the present invention.
Figure 4:
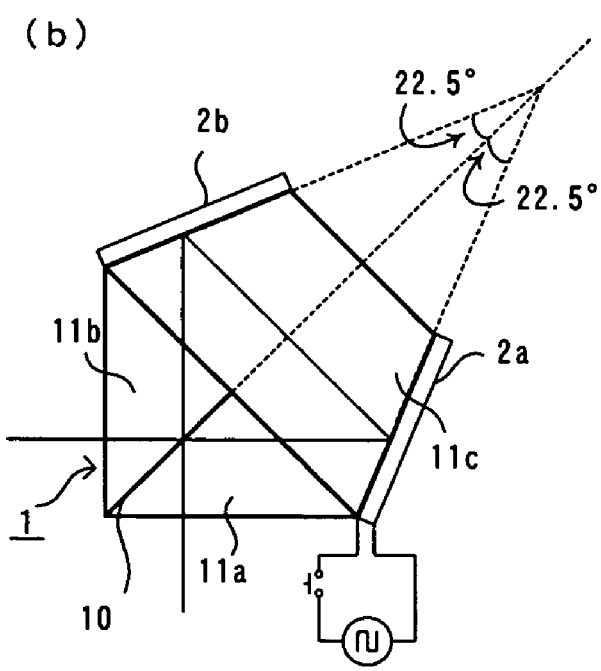

The first and second configuration examples described above are implemented by arranging polarized light separation/combination means, light reflectors, and polarization control means as shown in the configuration shown in FIG. 4.

FIG. 4(a) shows an example of the arrangement configuration. In this arrangement configuration, the polarized light separation/combination means 1 is configured by sandwiching a polarized light separation/combination film 10 by prisms 11a and 11b and is fixed on a frame not shown. On the other hand, the light reflectors 2a and 2b are positioned by fixing members that are installed on a frame not shown. The angle between the polarized light separation/combination means and the light reflectors can be determined by the fixing members installed on the frame. In this configuration example, air is between the light reflectors.

FIG. 4(b) shows another example of the arrangement configuration. In this arrangement configuration, the polarized light separation/combination means 1 is configured by sandwiching a polarized light separation/combination film 10 by prisms 11a and 11b. At the same time, the light reflectors 2a and 2b sandwich a trapezoid-shaped prism 11c, and the prisms 11a and 11b and prism 11c are joined.

This configuration allows the angle between the polarized light separation/combination means and the reflectors to be set by the prisms and, in addition, allows the optical path to be formed all within the prisms, thus reducing attenuation and scattering when the light travels through air.

Figure 5:
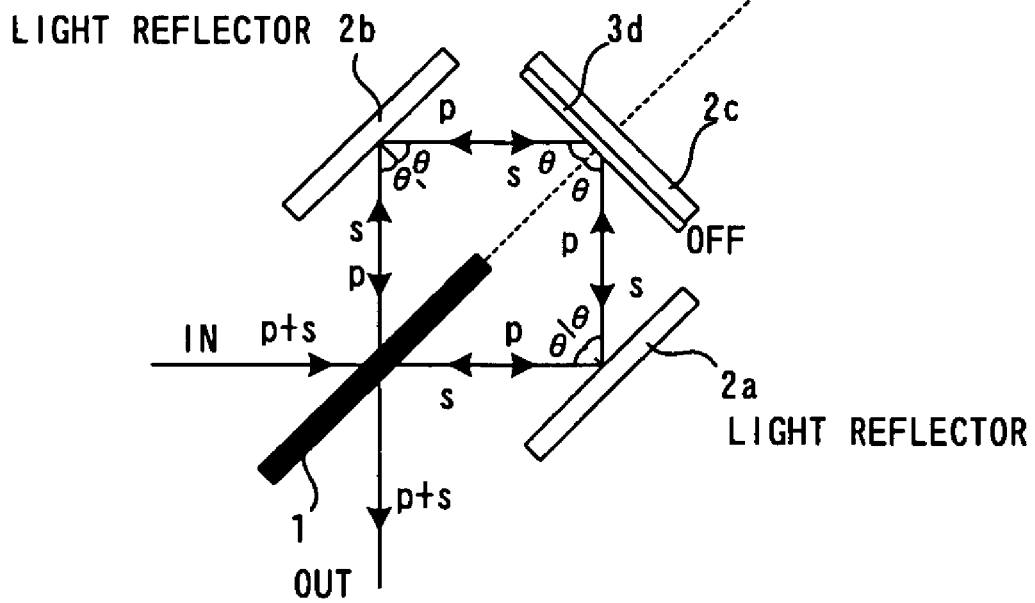
FIG. 5 is a diagram showing an example of a third configuration based on the basic configuration of the optical switch of the present invention and its operation state.
Figure 5:
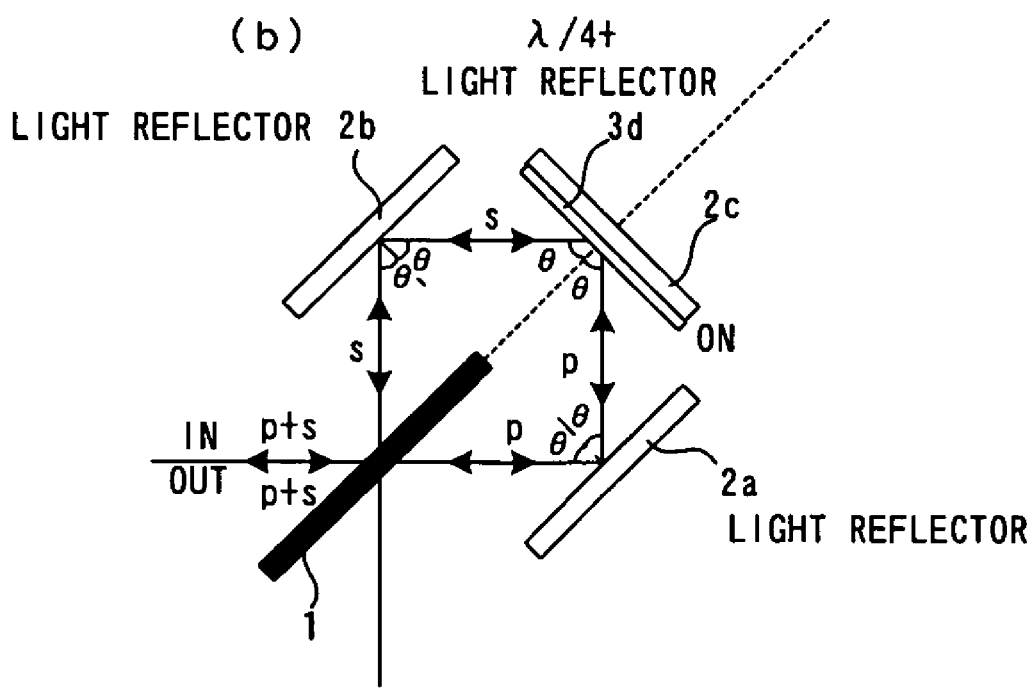

A third configuration example will be described with reference to FIG. 5. In the third configuration example, two light reflectors 2a and 2b are arranged symmetrically with respect to the polarized light separation/combination means so that the incoming angle and the outgoing angle of the polarization component become 45 degrees. In addition, one light reflector 2c is arranged that is in the optical path connecting the two light reflectors 2a and 2b and that is in a direction perpendicular to the light reflectors 2a and 2b.

The incoming angle and the outgoing angle are indicated by θ in the figure. In this configuration example, polarization control means 3d, which performs polarization control of λ/4 wavelength, is placed in the optical path in front of the light reflector 2c.

FIG. 5(a) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3d does not change polarization in this operation state, the polarization component p that goes straight is reflected by the light reflector 2a and passes through the polarization control means 3d with the polarization state unchanged. After that, the polarization component is reflected by the light reflector 2c and passes through the polarization control means 3d again. At this time, the polarization state does not change but the polarization component is still the polarization component p. The polarization component p is further reflected by the light reflector 2b and reaches the polarized light separation/combination means 1 again. At this time, the polarization component p travels in the direction at a right angle to the incoming direction. This polarization component p goes straight through the polarized light separation/combination means 1 and exits from the outgoing end, indicated by OUT in the figure, via a collimator not shown.

On the other hand, the polarization component s that reflects on the polarized light separation/combination means 1 is reflected by the light reflector 2b, is reflected by the light reflector 2c after passing through the polarization control means 3d with the polarization state unchanged because the polarization control means 3d does not change polarization in this operation state, and passes through the polarization control means 3d again. At this time, the polarization state does not change but the polarization component is still the polarization component s. The polarization component s is further reflected by the light reflector 2a, reaches the polarized light separation/combination means 1 again, is reflected, and exits from the outgoing end, indicated by OUT in the figure, via a collimator not shown. This causes the incoming light to exit from the end different from the incoming end.

FIG. 5(b) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3d changes polarization in this operation state, the polarization component p that goes straight is reflected by the light reflector 2a, passes through the polarization control means 3d with the wavelength changed by λ/4. After that, the polarization component is reflected by the light reflector 2c and passes through the polarization control means 3d again with the wavelength changed by λ/4 and is changed to the polarization component s. The polarization component s is reflected by the light reflector 2b and reaches the polarized light separation/combination means 1 again. This polarization component s is reflected by the polarized light separation/combination means 1 and exits from the outgoing end OUT, which is the same as the incoming end, via a collimator not shown.

On the other hand, the polarization component s that reflects on the polarized light separation/combination means 1 is reflected by the light reflector 2b. After that, the polarization component passes through the polarization control means 3d with the wavelength changed by λ/4, is reflected by the light reflector 2c, passes through the polarization control means 3d again with the wavelength changed by λ/4, and is changed to the polarization component p. The changed polarization component p is reflected by the light reflector 2a and reaches the polarized light separation/combination means 1 again. This polarization component p goes straight through the polarized light separation/combination means 1 and exits from the outgoing end OUT, which is the same as the incoming end, via a collimator not shown. This causes the incoming light to exit from the end that is the same as the incoming end.

In the fourth configuration example, the position of the polarization control means 3d is not limited to the position on the light reflector 2c shown in the above configuration example but any position on the light reflector 2a or light reflector 2b may be used.

Figure 6:
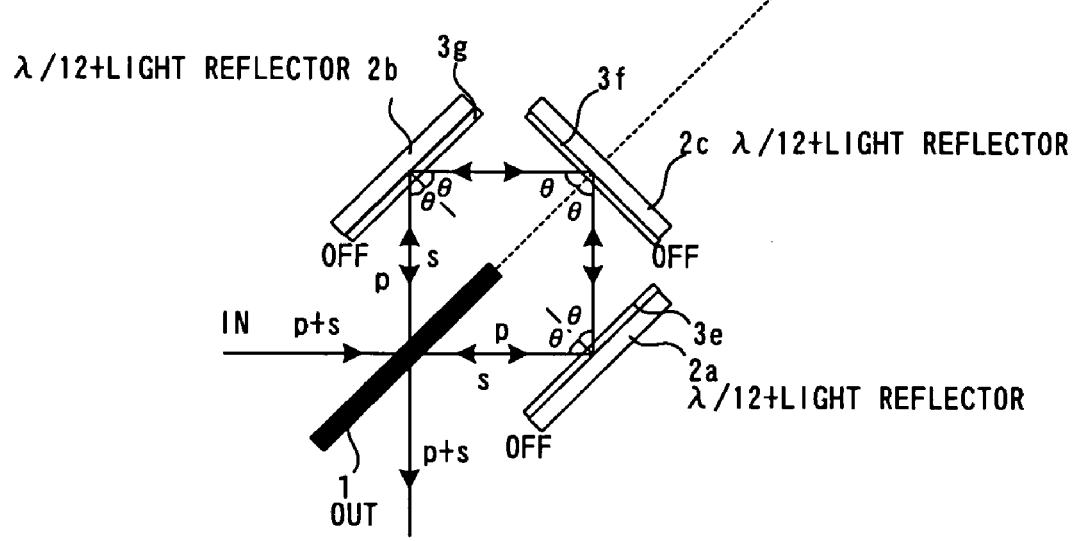
FIG. 6 is a diagram showing an example of a fourth configuration based on the basic configuration of the optical switch of the present invention and its operation state.
Figure 6:
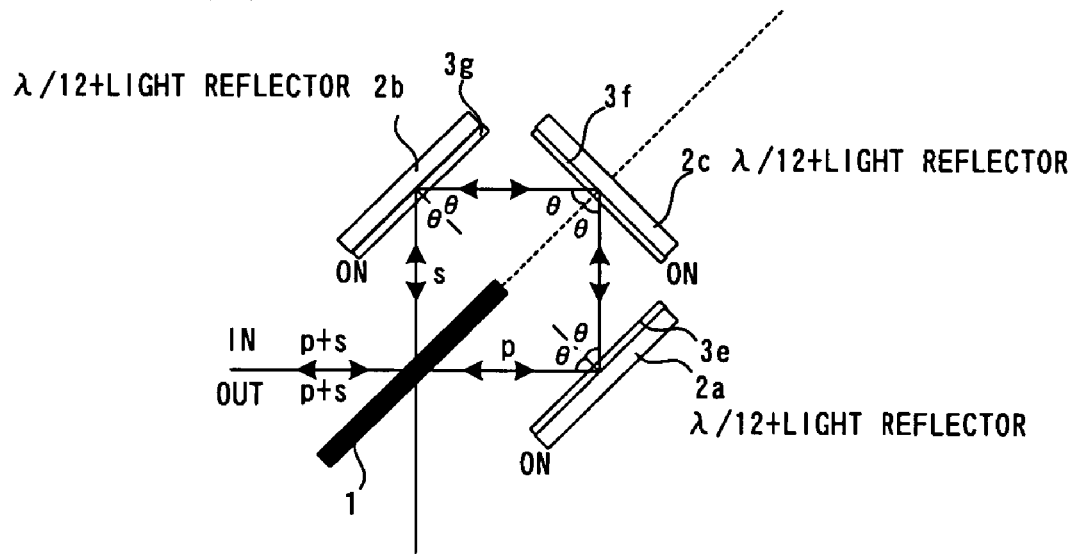

A fourth configuration example will be described with reference to FIG. 6. In the fourth configuration example, two light reflectors are arranged symmetrically with respect to the polarized light separation/combination means so that the incoming angle and the outgoing angle of the polarization component become 45 degrees. In addition, one light reflector is arranged that is in the optical path connecting the two light reflectors and that is in a direction perpendicular to those light reflectors. Another arrangement of the polarization control means is that the polarization control means for controlling polarization of λ/12 wavelength is placed in the optical path in front of each of three light reflectors.

The incoming angle and the outgoing angle are indicated by θ in the figure. In this configuration example, polarization control means 3e, 3f, and 3g, which perform polarization control of λ/12 wavelength, are placed on light reflector 2a, 2b, and 2c.

FIG. 6(a) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3e, 3f, and 3g do not change polarization in this operation state, the polarization component p that goes straight is reflected by the light reflectors 2a, 2b, and 2c and returns to the polarized light separation/combination means 1. Because the polarization component p passes through the polarization control means 3e, 3f, and 3g on the light reflectors 2a, 2b, and 2c with the polarization state unchanged, it returns to the polarized light separation/combination means 1 with polarization state unchanged. At this time, the polarization component p travels in the direction at a right angle to the incoming direction. This polarization component p goes straight through the polarized light separation/combination means 1 and exits from the outgoing end, indicated by OUT in the figure, via a collimator not shown.

On the other hand, the polarization component s that reflects on the polarized light separation/combination means 1 is reflected by the light reflectors 2a, 2b, and 2c and returns to the polarized light separation/combination means 1 because the polarization control means 3e, 3f, and 3g do not change polarization in this operation state. Because the polarization component s passes through the polarization control means 3e, 3f, and 3g on the light reflectors 2a, 2b, and 2c with the polarization state unchanged, it returns to and reflected by the polarized light separation/combination means 1 with the polarization state unchanged and exits from the outgoing end, indicated by OUT in the figure, via a collimator not shown.

This causes the incoming light to exit from the end different from the incoming end.

FIG. 6(b) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3e, 3f, and 3g change polarization in this operation state, the polarization component p that goes straight has its polarization changed by λ/12 wavelength twice each time it is reflected by each light reflector and so its polarization is changed by λ/6 wavelength. By performing this polarization change of λ/6 wavelength on the three light reflectors 2a, 2b, and 2c, the polarization is changed by λ/2 wavelength and the polarization component p is changed to the polarization component s. The polarization component s is reflected by the light reflector 2b and reaches the polarized light separation/combination means 1 again. This polarization component s is reflected by the polarized light separation/combination means 1 and exits from the outgoing end OUT, which is the same as the incoming end, via a collimator not shown.

On the other hand, the polarization component s that reflects on the polarized light separation/combination means 1, which travels through the paths in reverse order, has its polarization changed by λ/12 wavelength twice each time it is reflected by each light reflector, as with the polarization component p, and so its polarization is changed by λ/6 wavelength. By performing this polarization change of λ/6 wavelength on the three light reflectors 2a, 2b, and 2c, the polarization is changed by λ/2 wavelength and the polarization component s is changed to the polarization component p. The changed polarization component p is reflected by the light reflector 2a and reaches the polarized light separation/combination means 1 again. This polarization component p passes through the polarized light separation/combination means 1 straight and exits from the outgoing end OUT, which is the same as the incoming end, via a collimator not shown. This causes the incoming light to exit from the end that is the same as the incoming end.

A fifth configuration example will be described with reference to FIG. 7. In the fifth configuration example, three light reflectors are arranged at a right angle with each other as in the third and fourth configuration examples. One of the light reflectors next to the polarized light separation/combination means 1 is a total reflection mirror such as a prism, and the polarization control means for performing polarization control of λ/8 wavelength is placed in the optical path in front of the remaining two light reflectors.

Figure 7:
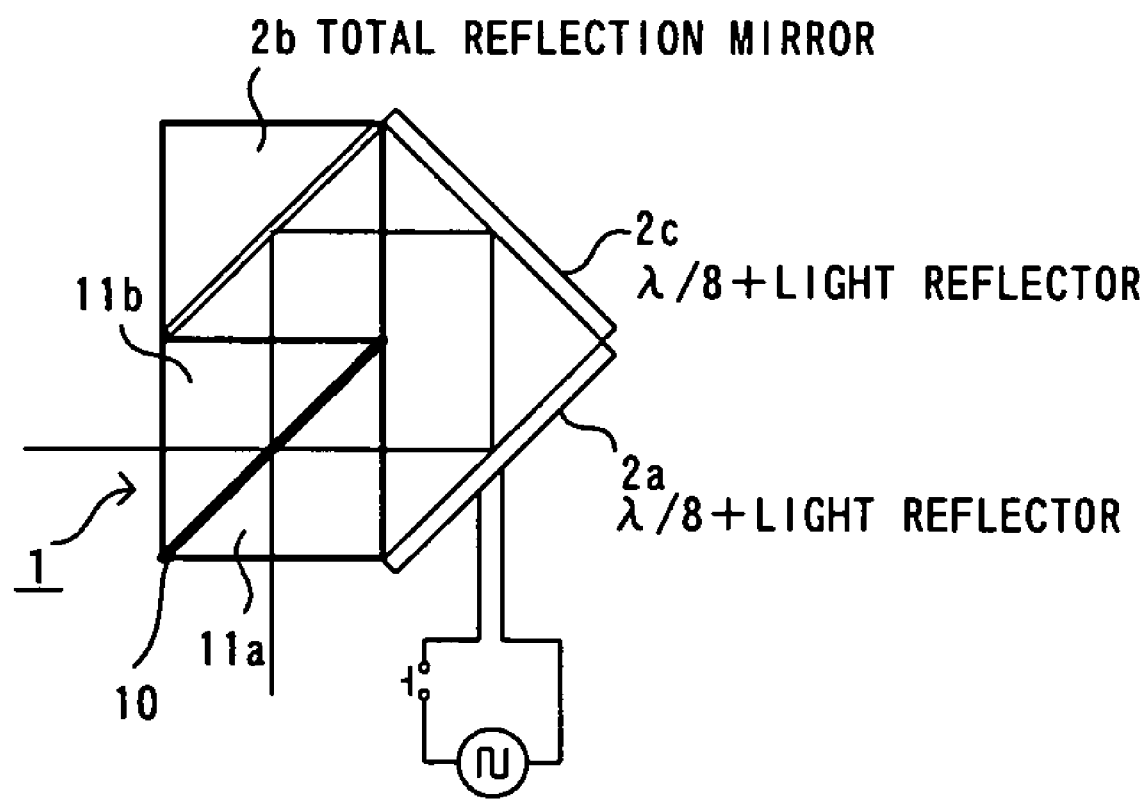
FIG. 7 is a diagram showing an example of a fifth configuration based on the basic configuration of the optical switch of the present invention and its operation state.

FIG. 7, shows a configuration in which the light reflector 2b is a prism and the polarization control means for performing polarization control of λ/8 wavelength are placed in the optical path in front of the two light reflectors 2a and 2c. In FIG. 7, the polarization control means is omitted.

Figure 8:
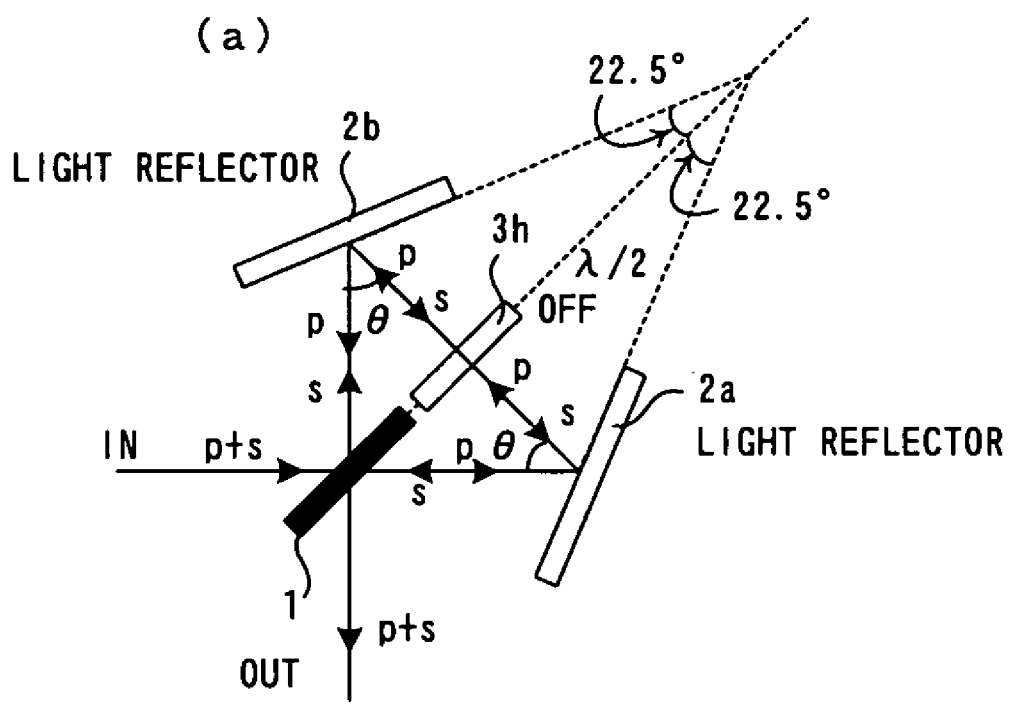
FIG. 8 is a diagram showing an example of a sixth configuration based on the basic configuration of the optical switch of the present invention and its operation state.
Figure 8:
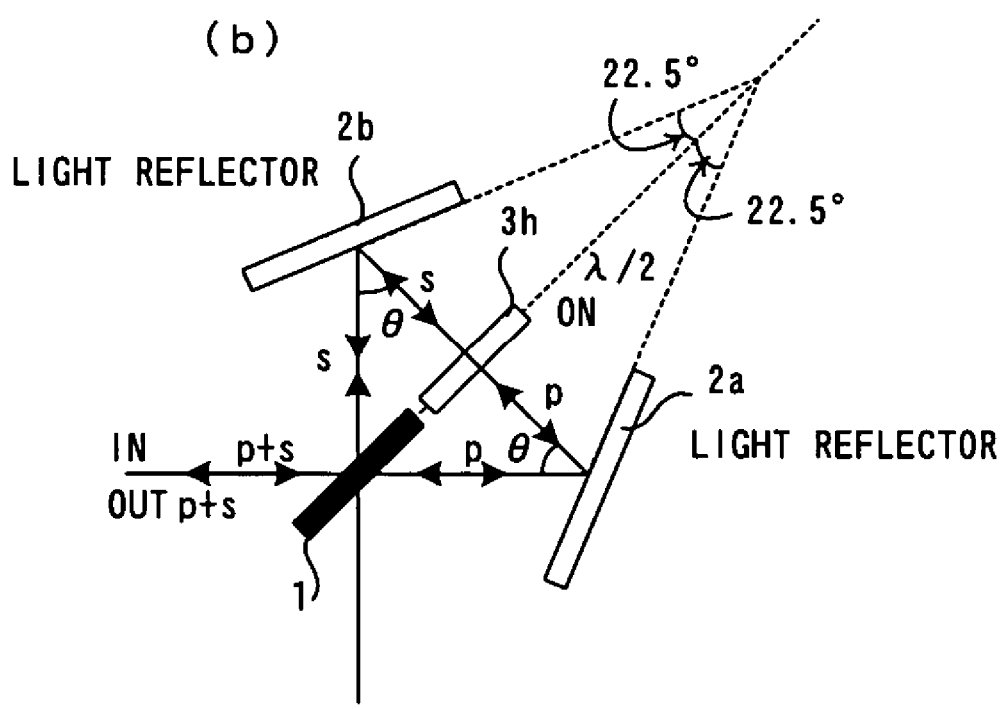

A sixth configuration example will be described with reference to FIG. 8. In the sixth configuration example, two light reflectors are arranged in positions that are symmetrical with respect to the polarized light separation/combination means so that the incoming angle and the outgoing angle of the polarization components become 22.5 degrees, and the polarization control means for performing polarization control of λ/2 wavelength is arranged in the optical path between the two light reflectors. In the figure, the incoming angle and the outgoing angle are indicated by θ. In this configuration example, polarization control means 3h for performing polarization control of λ/2 wavelength is placed in the optical path between the light reflectors 2a and 2b.

FIG. 8(a) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3h does not change polarization in this operation state, the polarization component p that goes straight is reflected by the light reflector 2a, passes through the polarization control means 3h with the polarization state unchanged, is reflected by the light reflector 2b, and returns to the polarized light separation/combination means 1. At this time, the polarization component p travels in the direction at a right angle to the incoming direction. This polarization component p goes straight through the polarized light separation/combination means 1 and exits from the outgoing end, indicated by OUT in the figure, via a collimator not shown.

On the other hand, the polarization component s that reflects on the polarized light separation/combination means 1 is reflected by the light reflector 2b and passes through the polarization control means 3h with the polarization state unchanged because the polarization control means 3h does not change polarization in this operation state, is reflected by the light reflector 2a, returns to the polarized light separation/combination means 1 and is reflected, and exits from the outgoing end, indicated by OUT in the figure, via a collimator not shown. This causes the incoming light to exit from the end different from the incoming end.

FIG. 8(b) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3h changes polarization in this operation state, the polarization component p that goes straight is reflected by the light reflector 2a, is changed to the polarization component s while passing through the polarization control means 3h, is reflected by the light reflector 2b, and returns to the polarized light separation/combination means 1. At this time, the polarization component s travels in the direction at a right angle to the incoming direction, is reflected by the polarized light separation/combination means 1, and exits from the outgoing end OUT, which is the same as the incoming end, via a collimator not shown.

On the other hand, the polarization component s that reflects on the polarized light separation/combination means 1 is reflected by the light reflector 2b, is changed to the polarization component p while passing through the polarization control means 3h, is reflected by the light reflector 2a, and returns to the polarized light separation/combination means 1. At this time, the polarization component p travels in the reverse direction of the incoming direction, passes straight through the polarized light separation/combination means 1, and exits from the outgoing end OUT, which is the same as the incoming end, via a collimator not shown. This causes the incoming light to exit from the same end as the incoming end.

Figure 9:
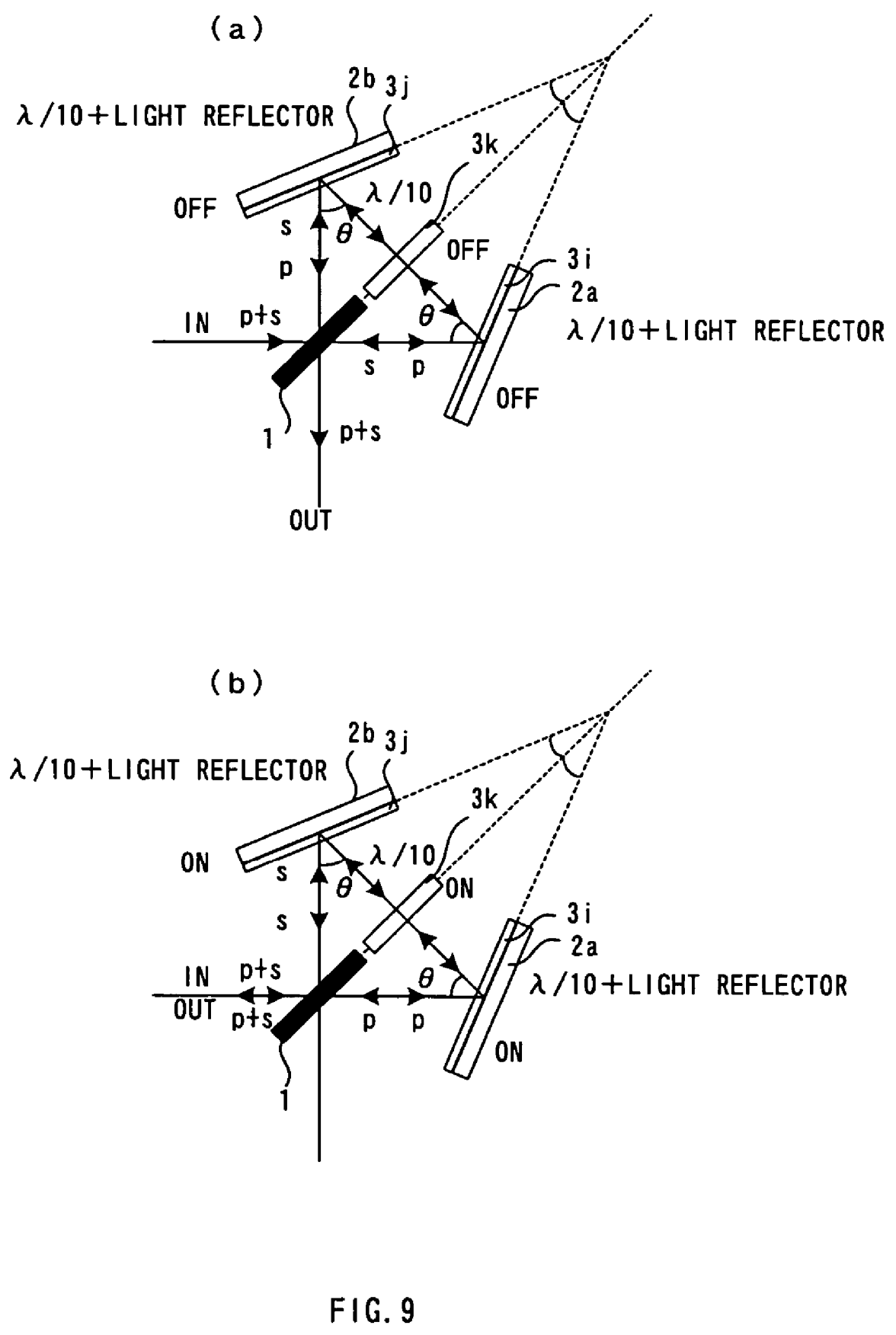

A seventh configuration example will be described with reference to FIG. 9. In the seventh configuration example, two light reflectors are arranged in positions that are symmetrical with respect to the polarized light separation/combination means so that the incoming angle and the outgoing angle of the polarization components become 22.5 degrees, and the polarization control means for performing polarization control of λ/10 wavelength is placed in the optical path in front of the two light reflectors and in the optical path between the two light reflectors. In the figure, the incoming angle and the outgoing angle are indicated by θ. In this configuration example, polarization control means 3i and 3j for performing polarization control of λ/10 wavelength are placed on the light reflectors 2a and 2b and the polarization control means 3k for performing polarization control of λ/10 wavelength is placed in the optical path between the light reflectors 2a and 2b.

FIG. 9(a) is a diagram showing the operation corresponding to the exchanging state described above. In this operation state, the polarization control means does not change polarization. When a liquid crystal cell is used as the polarization control means, a voltage is applied to the liquid crystal cell to put the optical switch in this operation state. In the figure, this operation state is indicated by OFF.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3i, 3j, and 3k do not change polarization in this operation state, the polarization component p that goes straight passes along the path while being reflected by the light reflectors 2a and 2b and passes through the polarization control means 3i, 3j, and 3k with the polarization state unchanged, is reflected by the light reflector 2b, and returns to the polarized light separation/combination means 1. At this time, the polarization component p travels in the direction at a right angle to the incoming direction. This polarization component p goes straight through the polarized light separation/combination means 1 and exits from the outgoing end, indicated by OUT in the figure, via a collimator not shown.

On the other hand, the polarization component s that reflects on the polarized light separation/combination means 1 is reflected by the light reflector 2b and passes through the polarization control means 3i, 3j, and 3k with the polarization state unchanged because the polarization control means 3i, 3j, and 3k do not change polarization, is reflected by the light reflector 2a, returns to and is reflected by the polarized light separation/combination means 1, and exits from the outgoing end, indicated by OUT in the figure, via a collimator not shown. This causes the incoming light to exit from the end different from the incoming end.

FIG. 9(b) is a diagram showing the operation corresponding to the straight state described above. In this operation state, the polarization control means changes polarization. When a liquid crystal cell is used as the polarization control means, a voltage is not applied to the liquid crystal cell to put the optical switch in this operation state. In the figure, this operation state is indicated by ON.

The light entering from the incoming end (IN in the figure) is changed to parallel beams by a collimator not shown and is separated by the polarized light separation/combination means 1 into the polarization component p that goes straight and the polarization component s that reflects.

Because the polarization control means 3i, 3j, and 3k change polarization in this operation state, the polarization component p that goes straight has its polarization changed twice by λ/10 wavelength, that is, by λ/5 wavelength, by the polarization control means 3i when reflected by the light reflector 2a, has its polarization changed by λ/10 wavelength as it passes through the polarization control means 3k, and has its polarization further changed twice by λ/10 wavelength, that is, by λ/5 wavelength, by the polarization control means 3j when reflected by the light reflector 2a. Finally, the polarization component p has its polarization changed by λ/2 wavelength and is changed to the polarization component s. The polarization component s is reflected by the light reflector 2b and returns to the polarized light separation/combination means 1. At this time, the polarization component s travels in the direction at a right angle to the incoming direction, is reflected by the polarized light separation/combination means 1, and exits from the outgoing end OUT, which is the same as the incoming end, via a collimator not shown.

On the other hand, the polarization component s that reflects on the polarized light separation/combination means 1 has its polarization changed twice by λ/10 wavelength, that is, by λ/5 wavelength, by the polarization control means 3j when reflected by the light reflector 2b, has its polarization changed by λ/10 wavelength as it passes through the polarization control means 3k, and has its polarization further changed twice by λ/10 wavelength, that is, by λ/5 wavelength, by the polarization control means 3i when reflected by the light reflector 2a. Finally, the polarization component s has its polarization changed by λ/2 wavelength, is changed to the polarization component p, and returns to the polarized light separation/combination means 1. The polarization component p passes straight through the polarized light separation/combination means 1 and exits from the outgoing end OUT, which is the same as the incoming end, via a collimator not shown. This causes the incoming light to exit from the same end as the incoming end.

Figure 10:
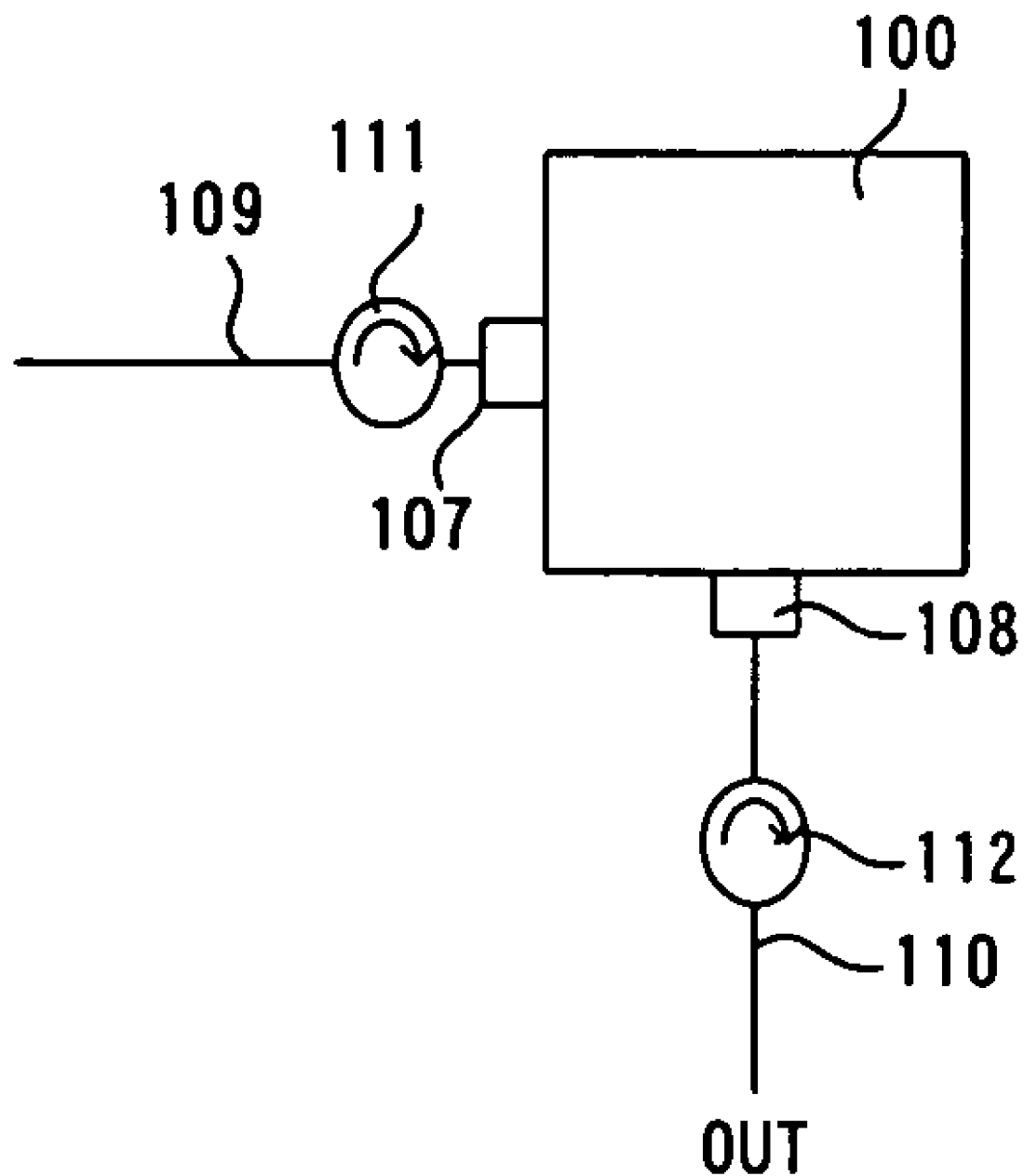
FIG. 10 is a diagram showing an example of the configuration of a 2×2 optical switch using the first to seventh configuration examples of the present invention.

FIG. 10 is a configuration example of a 2×2 optical switch using the first to seventh configuration examples. Referring to FIG. 10, the 2×2 optical switch can be configured by connecting optical fibers 109 and 110 to an optical switch 100 of the present invention via collimators 107 and 108 and installing circulators 111 and 112 on the optical fibers 109 and 110. The circulators 111 and 112 are used to separate an optical signal passing through the optical fibers.

Figure 11:
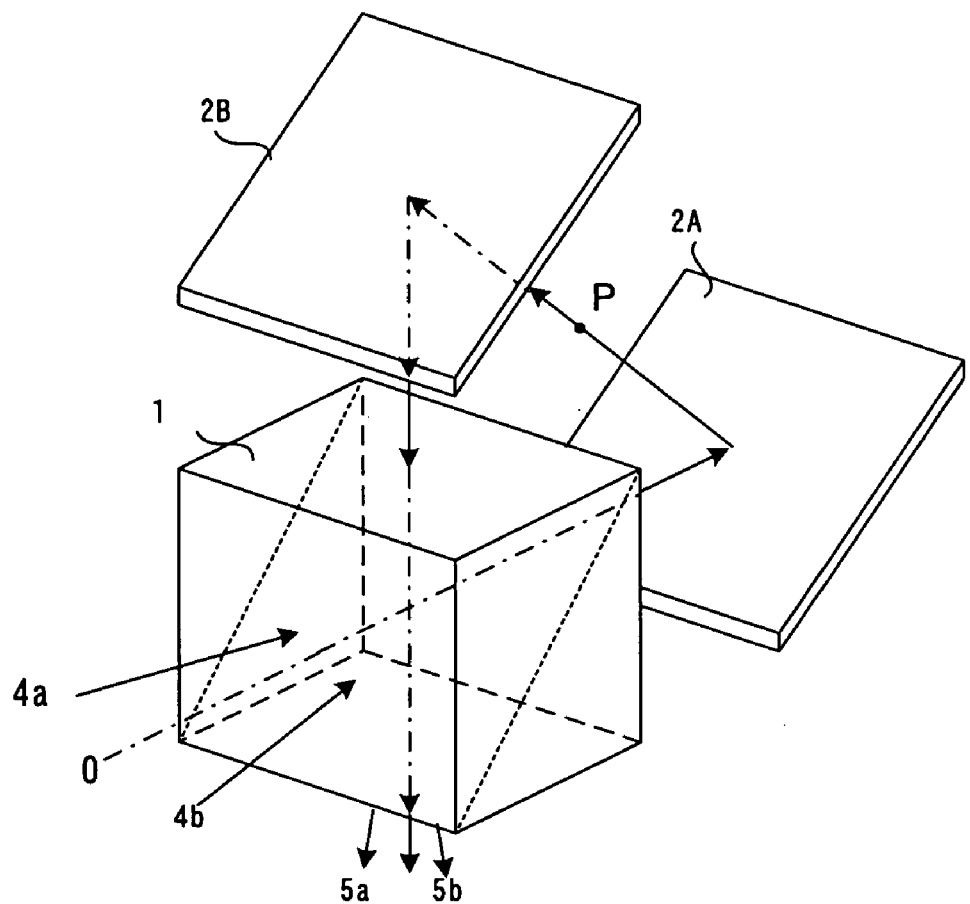
FIG. 11 is a diagram showing an example of another configuration based on the basic configuration of the optical switch of the present invention.
Figure 11:
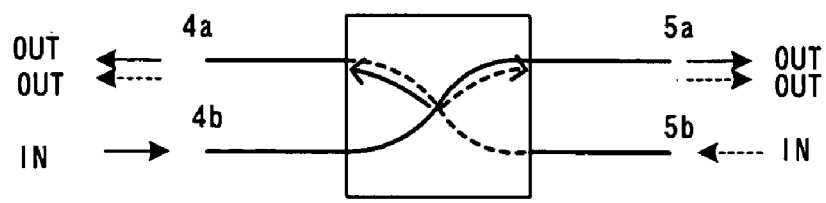

Next, another configuration example based on the basic configuration of the optical switch of the present invention, as well as the polarization state in that configuration example, will be described with reference to FIGS. 11–13.

In this configuration example, two input/output ports are arranged symmetrically, and with their optical axes adjusted, to the optical center of the optical path at the incoming end and the outgoing end in the basic configuration of the optical switch shown in FIG. 1.

In FIG. 11(a), two input/output ports 4a and 4b and two input/output ports 5a and 5b are provided. The input/output ports 4a and 4b are set with the optical axis adjusted to the optical center P of an optical path o, and the input/output ports 5a and 5b are also set with the optical axis adjusted to the optical center P of the optical path o. This configuration eliminates the need for the optical switch to have a circulator.

FIG. 11(b) shows the operation of the optical switch. For example, a signal entering from the input/output port 4b can be switched and output to the input/output port 5a or input/output port 4a without requiring a circulator. Also, a signal entering from the input/output port 5b can be switched and output to the input/output port 4a or input/output port 5a without requiring a circulator.

Figure 12:
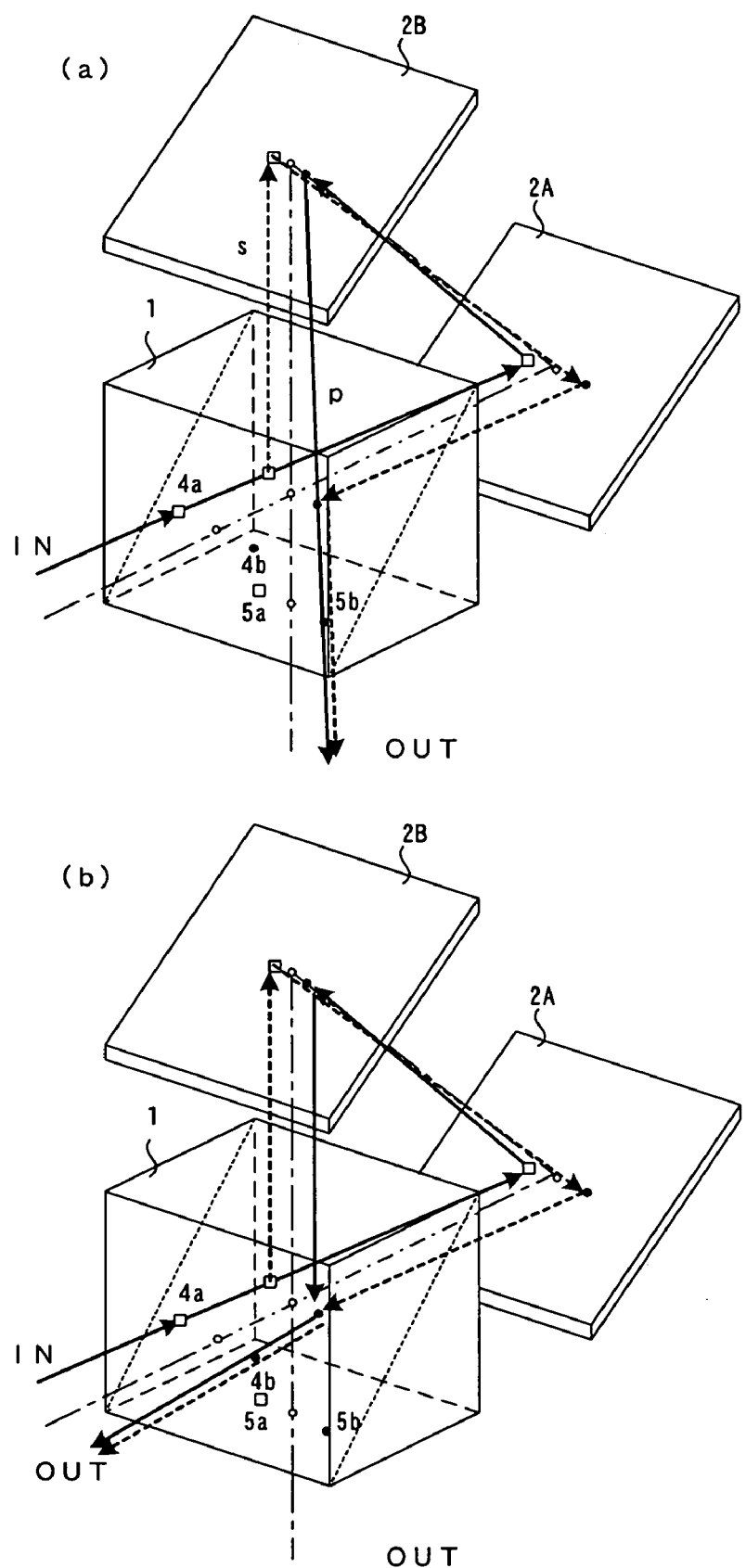
FIG. 12 is a diagram showing the polarization status of the other configuration example based on the basic configuration of the optical switch of the present invention.

FIG. 12 is a diagram showing the operation in the configuration described above. FIG. 12(a) shows the operation in which a light entering from the input/output port 4a exits from the input/output port 5b. During this operation, polarization control means not shown does not change polarization. The polarization component p and the polarization component s of the light entering from the input/output port 4*a* are separated by the polarized light separation/combination means 1, are reflected by the reflection means 2A and 2B, and reach the input/output port 5*b*. Because the input/output ports are arranged symmetrically, and with the optical axis adjusted, to the optical center of the optical path, the polarization components exit from the other input/output port 5*b* with the paths crossed as shown in FIG. 11(*b*).

On the other hand, FIG. 12(*b*) shows the operation in which a light entering from the input/output port 4*a* exits from the input/output port 4*b* in the same side. During this operation, polarization control means not shown changes polarization. The polarization component p and the polarization component s of the light entering from the input/output port 4*b* are separated by the polarized light separation/combination means 1, are reflected by the reflection means 2A and 2B and have their polarization changed in the optical path, reach the polarized light separation/combination means 1, and are reflected. Because the input/output ports are arranged symmetrically, and with the optical axis adjusted, to the optical center of the optical path, the polarization components exit from the other input/output port 4*b* in the same side with the paths crossed.

Figure 13:
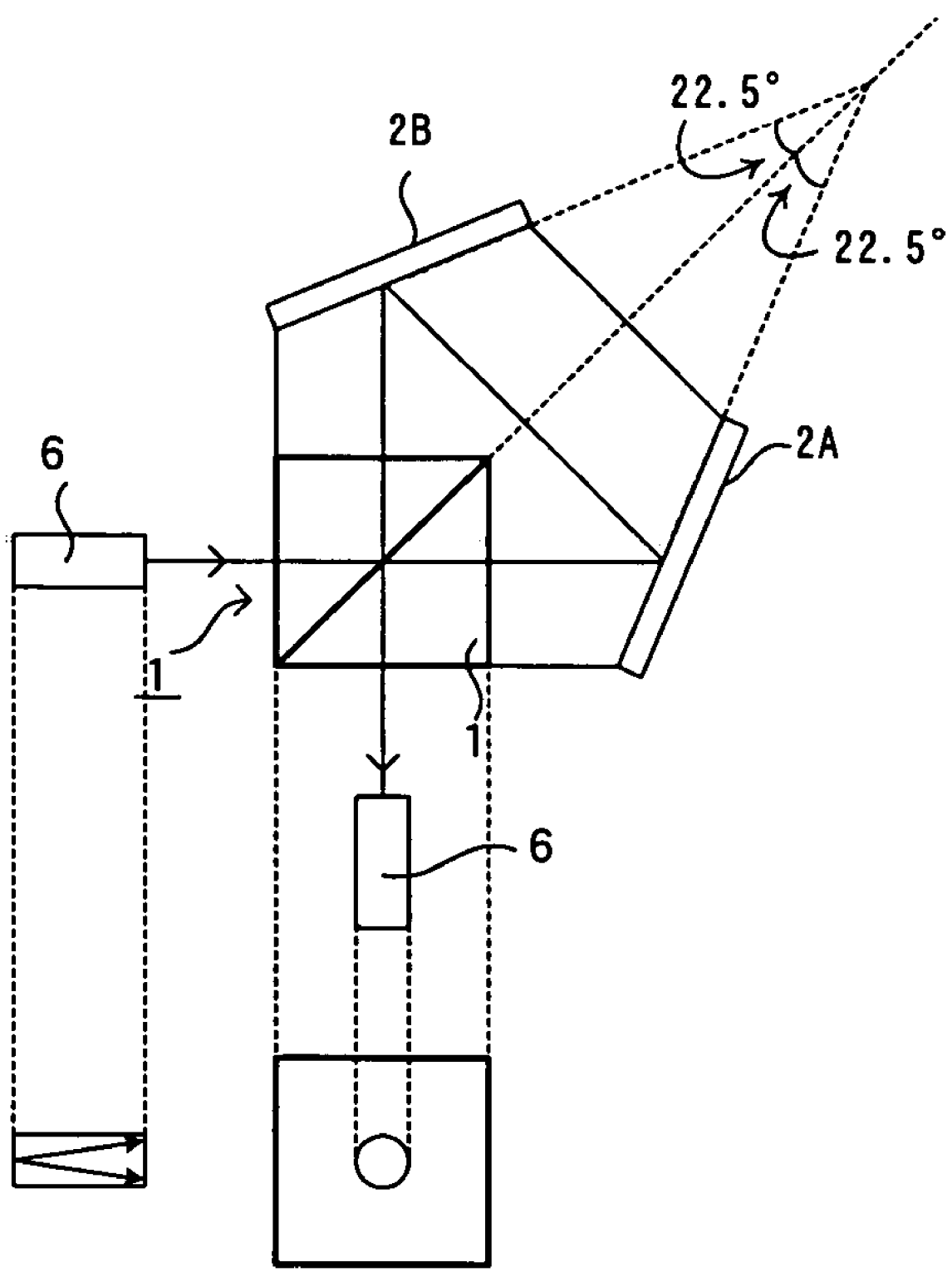
FIG. 13 is a diagram showing an example of the configuration in which a 2-core collimator is applied to the optical switch of the present invention.

A 2-core collimator can be used as a collimator, used to connect the optical fiber to the optical switch in this configuration, as shown in FIG. 13. A 2-core collimator 6 is arranged corresponding to 4*a* and 4*b* or 5*a* and 5*b* in FIGS. 11 and 12.

Next, an example of the configuration of an optical switch of the present invention, which uses unilateral polarization, will be described with reference to FIGS. 14–18.

Figure 14:
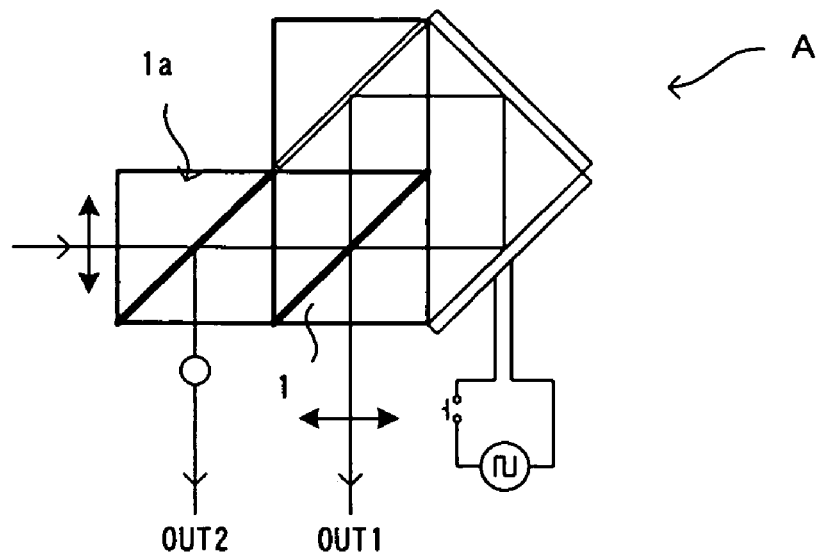
FIG. 14 is a diagram showing an example of the configuration of an optical switch that uses unilateral polarization in the optical switch of the present invention.
Figure 14:
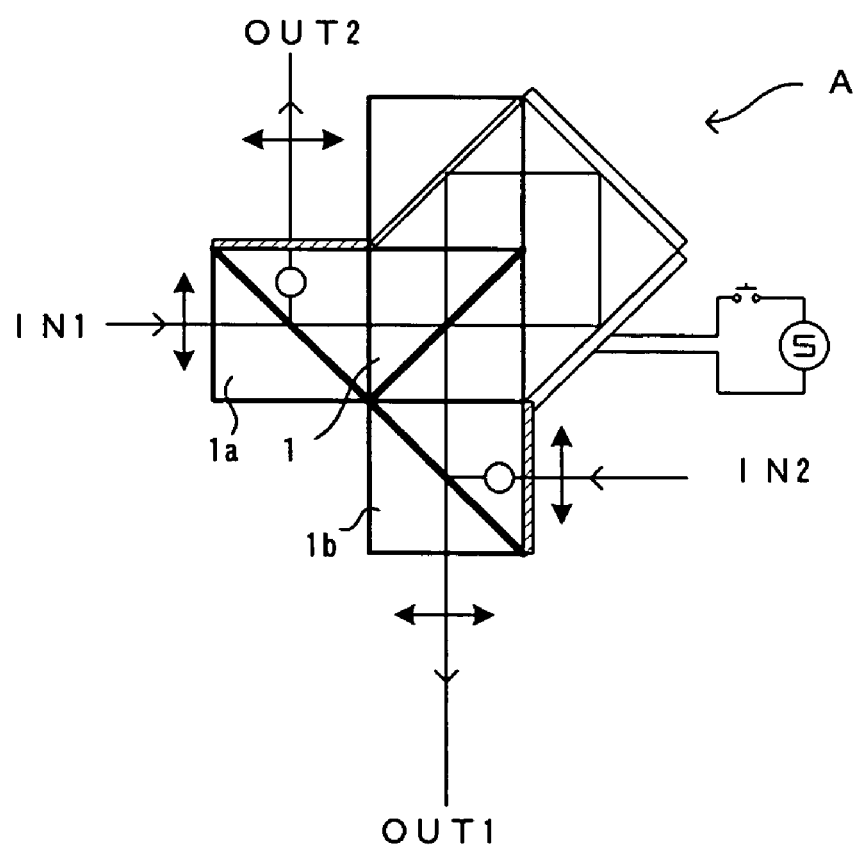

FIG. 14 shows an example of the configuration of an optical switch shown in FIG. 7 and using only unilateral polarization. FIG. 14(*a*) shows a 1×2 optical switch, and FIG. 14(*b*) shows a 2×2 optical switch.

In the 1×2 optical switch shown in FIG. 14(*a*), polarized light separation/combination means 1*a* is provided at one end of the polarized light separation/combination means 1 provided in an optical switch A of the present invention. One end of the polarized light separation/combination means 1*a* is an incoming end (IN), and the other end of the polarized light separation/combination means 1*a* and the other end of the polarized light separation/combination means 1 are output ends (OUT2 and OUT1, respectively).

A light entering, for example, from the input end IN in this configuration exits from the output end OUT1 when the optical switch A does not change polarization, and exits from the output end OUT2 when the optical switch A changes polarization.

In the 2×2 optical switch shown in FIG. 14(*b*), the polarized light separation/combination means la is provided at one end of the polarized light separation/combination means 1 provided in the optical switch A of the present invention and a polarized light separation/combination means 1*b* is provided at the other end. One end of each of the polarized light separation/combination means 1*a* and 1*b* is an incoming end (IN1, IN2), and the other end of each of the polarized light separation/combination means 1*a* and 1*b* is an output end (OUT2 and OUT1, respectively). In the configuration example in FIG. 14(*b*), a λ/2 wave plate is provided at the input end IN2 and the output end OUT2 to adjust the polarization state of the output.

A light entering, for example, from the input end IN1 in this configuration exits from OUT1 when the optical switch A does not change polarization, and exits from OUT2 when the optical switch A changes polarization. Similarly, a light entering from the input end IN2 exits from OUT2 when the optical switch A does not change polarization, and exits from OUT1 when the optical switch A changes polarization.

Figure 15:
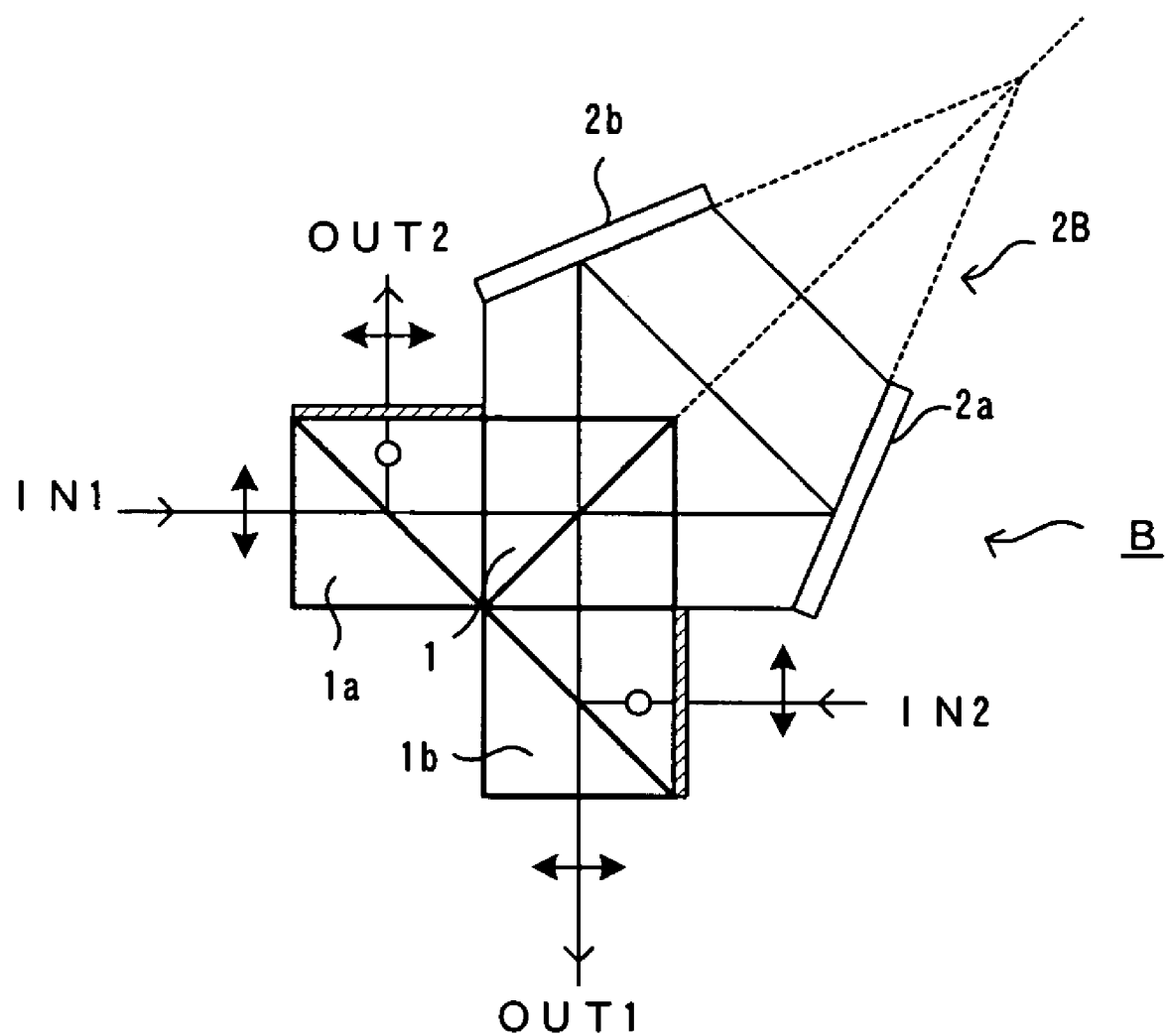
FIG. 15 is a diagram showing an example of the configuration of an optical switch using unilateral polarization in the optical switch of the present invention.

FIG. 15 shows another example of the configuration of a 2×2 optical switch using only unilateral polarization. In this configuration example, polarized light separation/combination means 1*a* is provided at one end of the polarized light separation/combination means 1 provided in the optical switch B having the configuration shown in FIG. 4, and a polarized light separation/combination means 1*b* is provided at the other end. One end of each of the polarized light separation/combination means 1*a* and 1*b* is an incoming end (IN1, IN2), and the other end of each of the polarized light separation/combination means 1*a* and 1*b* is an output end (OUT2 and OUT1, respectively). In the configuration example in FIG. 15, a λ/2 wave plate is provided at the input end IN2 and the output end OUT2 to adjust the polarization state of the output.

In this configuration, too, a light entering, for example, from the input end IN1 exits from OUT1 when the optical switch B does not change polarization, and exits from OUT2 when the optical switch B changes polarization. Similarly, a light entering from the input end IN2 exits from OUT2 when the optical switch B does not change polarization, and exits from OUT1 when the optical switch B changes polarization.

This 2×2 optical switch using only the unilateral polarization can be used not only as the optical switching function but also as an attenuator.

Figure 16:
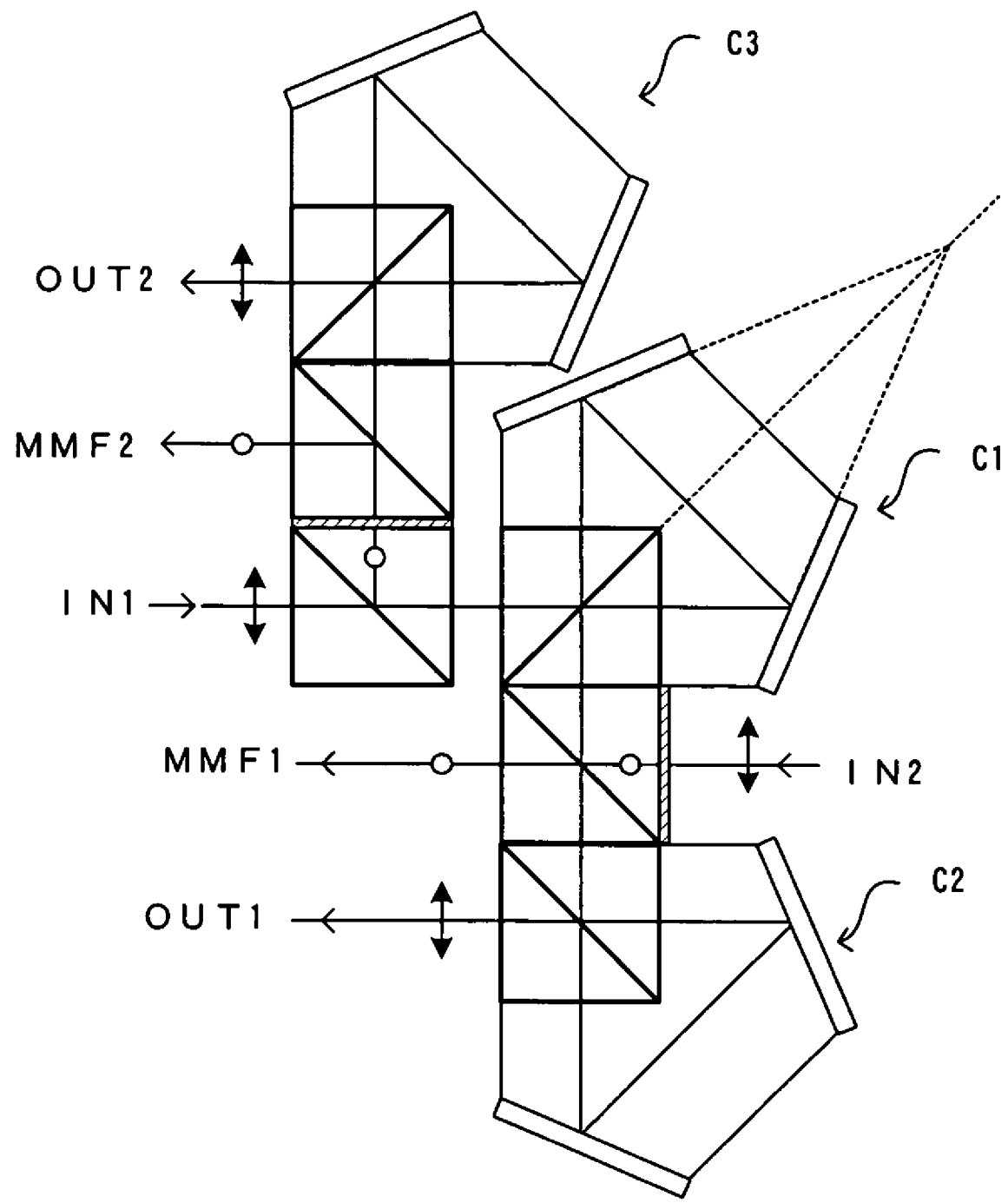
FIG. 16 is a diagram showing an example of the configuration in which a 2×2 switch and attenuators are combined using unilateral polarization in the optical switch of the present invention.
Figure 17:
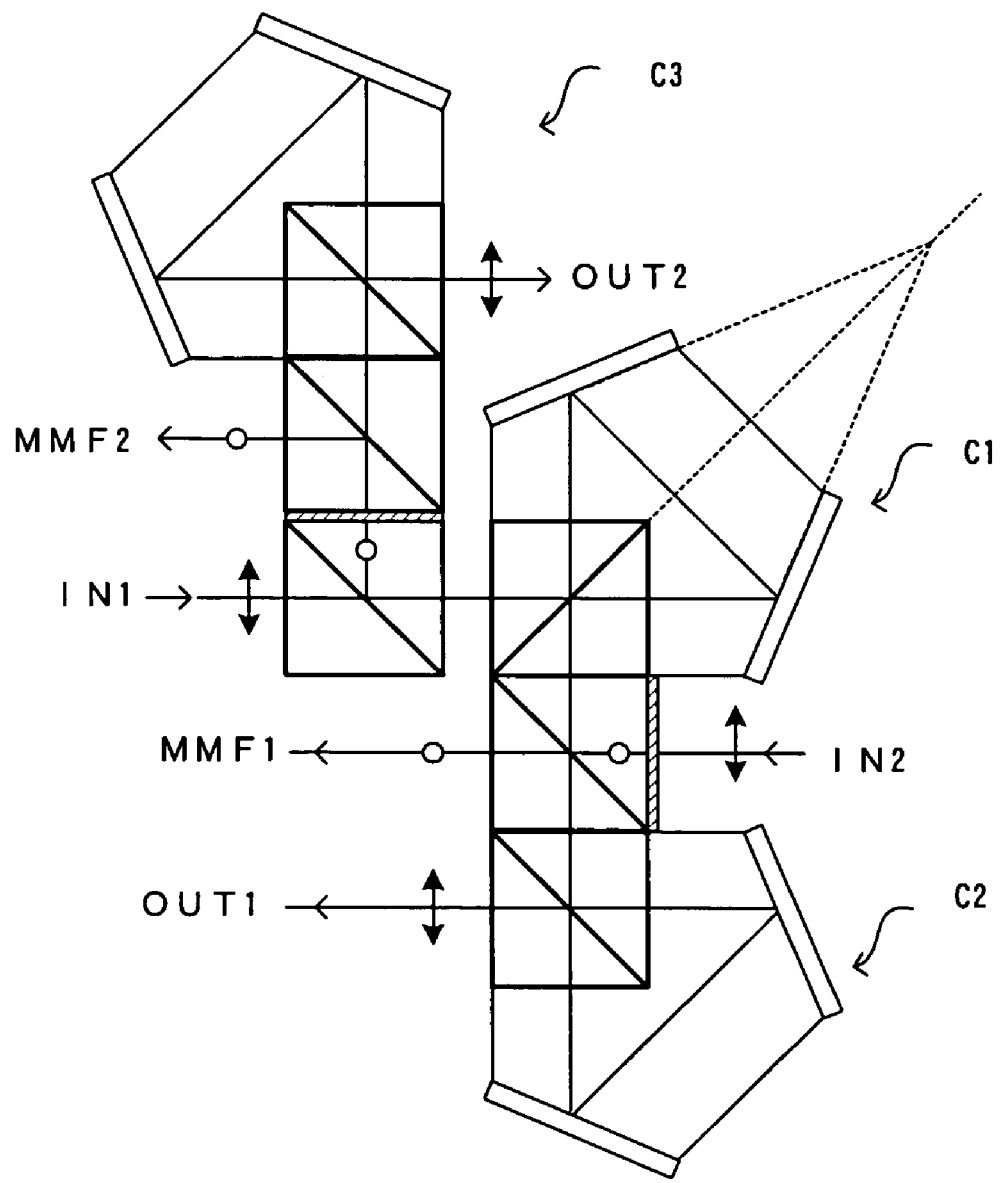
FIG. 17 is a diagram showing an example of the configuration in which a 2×2 switch and attenuators are combined using unilateral polarization in the optical switch of the present invention.
Figure 18:
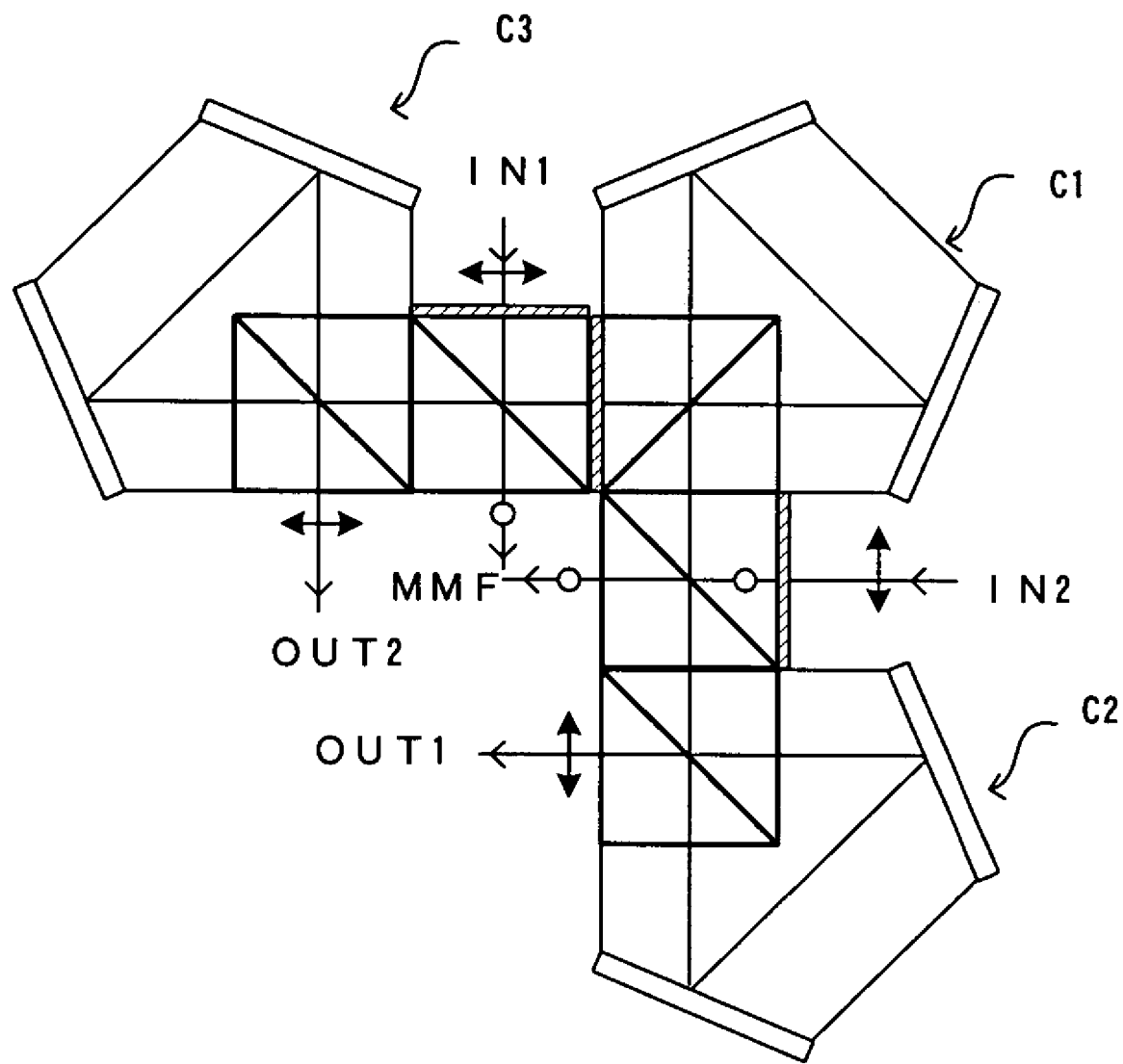
FIG. 18 is a diagram showing an example of the configuration in which a 2×2 switch and attenuators are combined using unilateral polarization in the optical switch of the present invention.

FIG. 16 to FIG. 18 show configuration examples of a combination of a 2×2 optical switch and an attenuator. This can be configured by combining the configuration example shown in FIG. 15.

The configurations created by combining a 2×2 optical switch and an attenuator, shown in FIG. 16 to FIG. 18, are each a combination of three optical switches C1, C2, and C3. The optical switch C1 out of the three is used as optical switching means, and the remaining optical switches C2 and C3 are used as an attenuator.

Polarized light separation/combination means is provided at the ends that are the ends of optical switches C2 and C3 constituting the attenuators and that are in the side connected to the optical switch C1. A multi mode fiber (MMF), if connected to this end, externally emits a polarization component attenuated by the attenuators. By externally emitting a polarization component, attenuated by the attenuator, from the MMF, this configuration can eliminate a heat source from the attenuator and achieves the effect of eliminating the need to provide cooling means.

According to this configuration, for example, in the configuration in FIG. 16, a light entering, for example, from the input end IN1 exits from OUT1 when the optical switch C1 does not change polarization, and exits from OUT2 when the optical switch C1 changes polarization. Similarly, a light entering from the input end IN2 exits from OUT2 when the optical switch C1 does not change polarization, and exits from OUT1 when the optical switch C1 changes polarization.

At this time, when the light exits from OUT1, the polarization component attenuated by the attenuator, which is the optical switch C2, is emitted from MMF1. When the light exits from OUT2, the polarization component attenuated by the attenuator, which is the optical switch C3, is emitted from MMF2. Because FIG. 17 and FIG. 18 show the same operation, the description is omitted.

According to this configuration, combining a 2×2 optical switch and attenuators in various arrangements enables the incoming end and the outgoing end to be arranged according to the need as shown in FIG. 16 to FIG. 18.

This configuration further enables not only the two-dimensional arrangement but also the three-dimensional arrangement. FIG. 19(a) and FIG. 19(b) show an example of the configuration in which a 2×2 optical switch and attenuators are combined in the three-dimensional arrangement. FIG. 19(b) shows the arrangement position of the λ/2 wave plate in the configuration shown in FIG. 19(a).

In the configuration using unilateral polarization where the polarization direction varies according to the arrangement, the λ/2 wave plate is placed in a predetermined position to cause the configuration to work as an optical switch. In the configuration example shown in FIG. 19, the p-polarized light (unilateral polarization) is used as the incoming linearly polarized light. In this configuration example, the λ/2 wave plate is placed in the position indicated in FIG. 19(b) to configure an optical switch.

Figure 19:
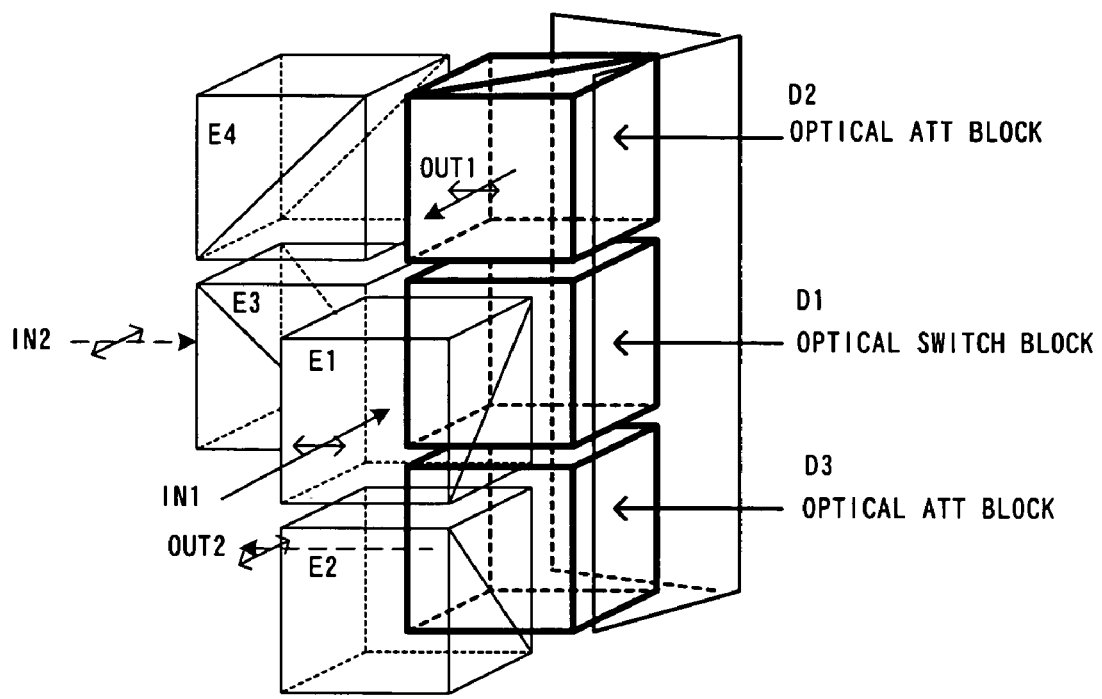
FIG. 19 is a diagram showing an example of the configuration in which a 2×2 optical switch and attenuators are combined in the three-dimensional arrangement using the optical switch of the present invention.
Figure 19:
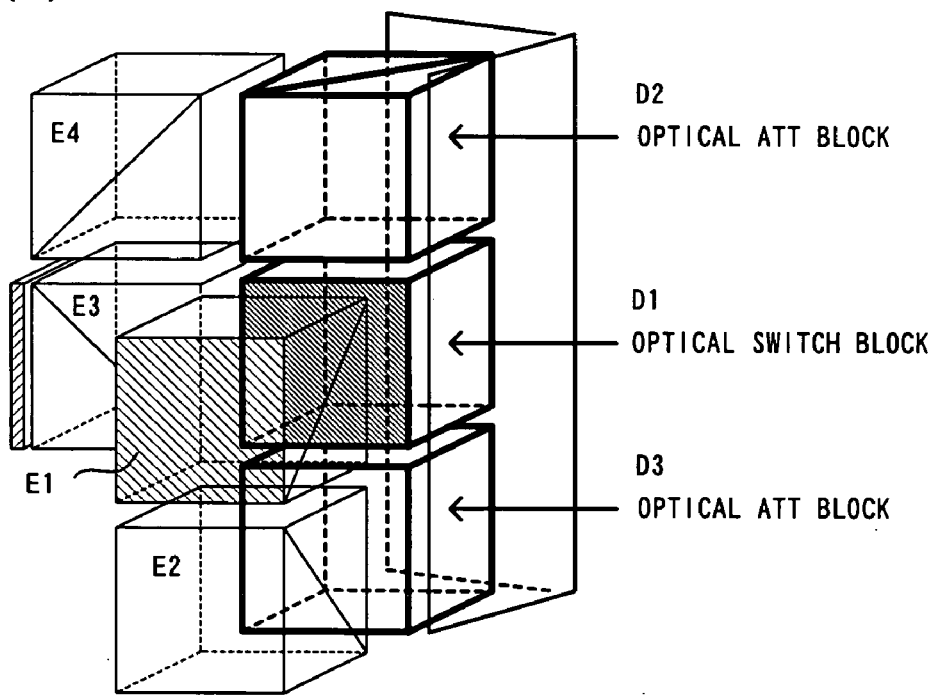

In FIG. 19, optical switch blocks D1, D2, and D3 corresponding to the optical switches C1, C2, and C3 are stacked, and the polarized light separation/combination blocks E1, E2, E3, and E4 are placed next to the optical switch blocks D1, D2, and D3 to arrange them in three dimensions. The optical switch block D1 is used as optical switching means, while the remaining optical switch blocks D2 and D3 are used as the attenuators.

In this three-dimensional arrangement configuration, too, the light entering from the incoming end IN1 exits from OUT1 when polarization is not changed, and exits from OUT2 when polarization is changed, as in the two-dimensional arrangement described above. Similarly, the light entering from the incoming end IN2 exits from OUT2 when polarization is not changed, and exits from OUT1 when polarization is changed. In addition, the attenuated polarization component can be emitted from the attenuators, which are optical switch blocks D2 and D3, via an MMF not shown. FIG. 19(b) shows an example of the configuration in which the λ/2 wave plate is provided.

Although the optical switch blocks D1, D2, and D3 are separated in FIG. 19, they may be configured as one-column polarized light separation/combination means.

This three-dimensional arrangement requires fewer parts than the two-dimensional arrangement. A configuration that minimizes the interference at the incoming/outgoing end of each member is also possible to make the device configuration compact.

Figure 20:
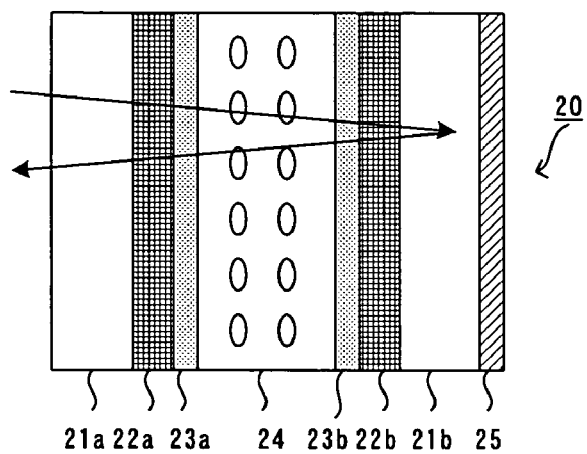
FIG. 20 is a diagram showing an example of the configuration of a liquid crystal cell that can be applied to polarization control means used in the optical switch of the present invention.
Figure 20:
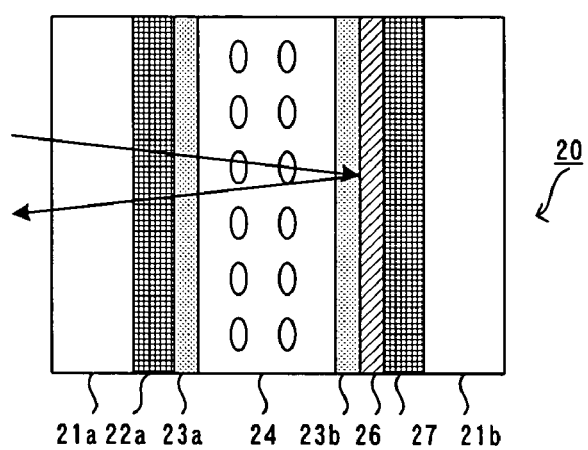
Figure 20:
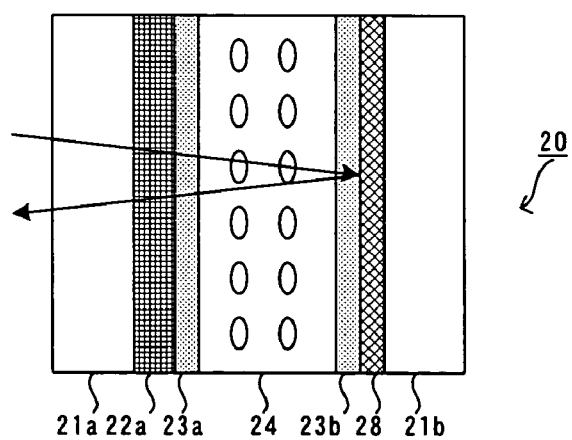

FIG. 20 shows an example of the configuration of a liquid crystal cell that can be applied to the polarization control means used in the optical switch according to the present invention.

The configuration in which a liquid crystal cell and a light reflector are combined will be described below. There are two combinations of a liquid crystal cell and a light reflector when the configuration is viewed from the light incoming end side: a configuration in which the light reflector is placed outside the liquid crystal cell and a configuration in which the light reflector is placed inside the liquid crystal cell. FIG. 20(a) shows an example of the configuration in which the light reflector is placed outside the liquid crystal cell, and FIGS. 20(b) and 20(c) show an example of the configuration in which the light reflector is placed inside the liquid crystal cell.

Referring to FIG. 20(a), a liquid crystal cell 20 comprises, from the light incoming side, a substrate 21a such as a glass, a transparent electrode film 22a such as an ITO film, an alignment film 23a, a liquid crystal layer 24, an alignment film 23b, a transparent electrode film 22b, a substrate 21b, and an external light reflector 25. The external light reflector 25 is a dielectric multi-layer film or a metallic film of highly reflective materials such as aluminum or gold.

Referring to FIG. 20(b), a liquid crystal cell 20 comprises, from the light incoming side, a substrate 21a such as a glass, a transparent electrode film 22a such as an ITO film, an alignment film 23a, a liquid crystal layer 24, an alignment film 23b, an internal light reflector 26, a conductive film 27, and a substrate 21b. The internal light reflector 26 is a dielectric multi-layer film that applies an electric field through the conductive film 27. The conductive film 27 is a transparent electrode film made of ITO, and the substrate 21b is made of not only a transparent material such as a glass but also an opaque material.

Referring to FIG. 20(c), a liquid crystal cell 20 comprises, from the light incoming side, a substrate 21a such as a glass, a transparent electrode film 22a such as an ITO film, an alignment film 23a, a liquid crystal layer 24, an alignment film 23b, an internal light reflector 28, and a substrate 21b. The internal light reflector 28, which functions also as the lower electrode, is a metallic film. The substrate 21b is made of not only a transparent material such as a glass but also an opaque material.

An insulating film for preventing a short circuit between the top substrate and the bottom substrate can also be formed on the bottom of the alignment film (or on the top of the electrode) in the liquid crystal cell having the configuration described above. Also, in a configuration in which there is an air layer between the liquid crystal cell and the prism, it is desirable to form a reflection prevention film (AR: Antireflection Coating), made of a dielectric multi-layer film, to prevent an unnecessary reflection on the surface of the liquid crystal cell.

The alignment of the liquid crystal element can be an anti-parallel alignment or a parallel alignment. As the liquid crystal, a ferroelectric liquid crystal or a twisted nematic liquid crystal can be used.

The liquid crystal cell used in the optical switch according to the present invention can perform the switch operation that controls the azimuthal angle of the incoming linearly-polarized light in two states: 90-degree rotation and 0-degree rotation that means no rotation. A liquid crystal cell capable of gradient control, if used, could constitute a variable optical attenuator that operates on polarization in an intermediate state.

In the configuration in which a plurality of liquid crystal cells are used in the optical switch according to the present invention, only the polarization component s or only the polarization component p can be obtained by selecting a liquid crystal cell that can perform polarization change. This can also be used to configure a variable optical attenuator.

When optical switching is performed using the switching operation of a liquid crystal cell, the response speed of the liquid crystal cell depends on the thickness of the liquid crystal cell. The configuration of the optical switch according to the present invention, in which a plurality of liquid crystal cells are used to perform the polarization change of λ/2 wavelength as shown in the configuration examples in FIG. 2, 4, and 6, makes the liquid crystal cells thinner and improves the response time.

For example, in the second configuration example, the thickness of each liquid crystal cell becomes ½ and the response time, which is squared, becomes four times faster as compared with that of the same type of high reflective liquid crystal cell. Similarly, in the fourth configuration example, the thickness of each liquid crystal cell is ⅓ and the response time becomes nine times faster and, similarly, in the sixth configuration example, the thickness of each liquid crystal cell is ⅔ and the response time becomes about six times faster.

Figure 21:
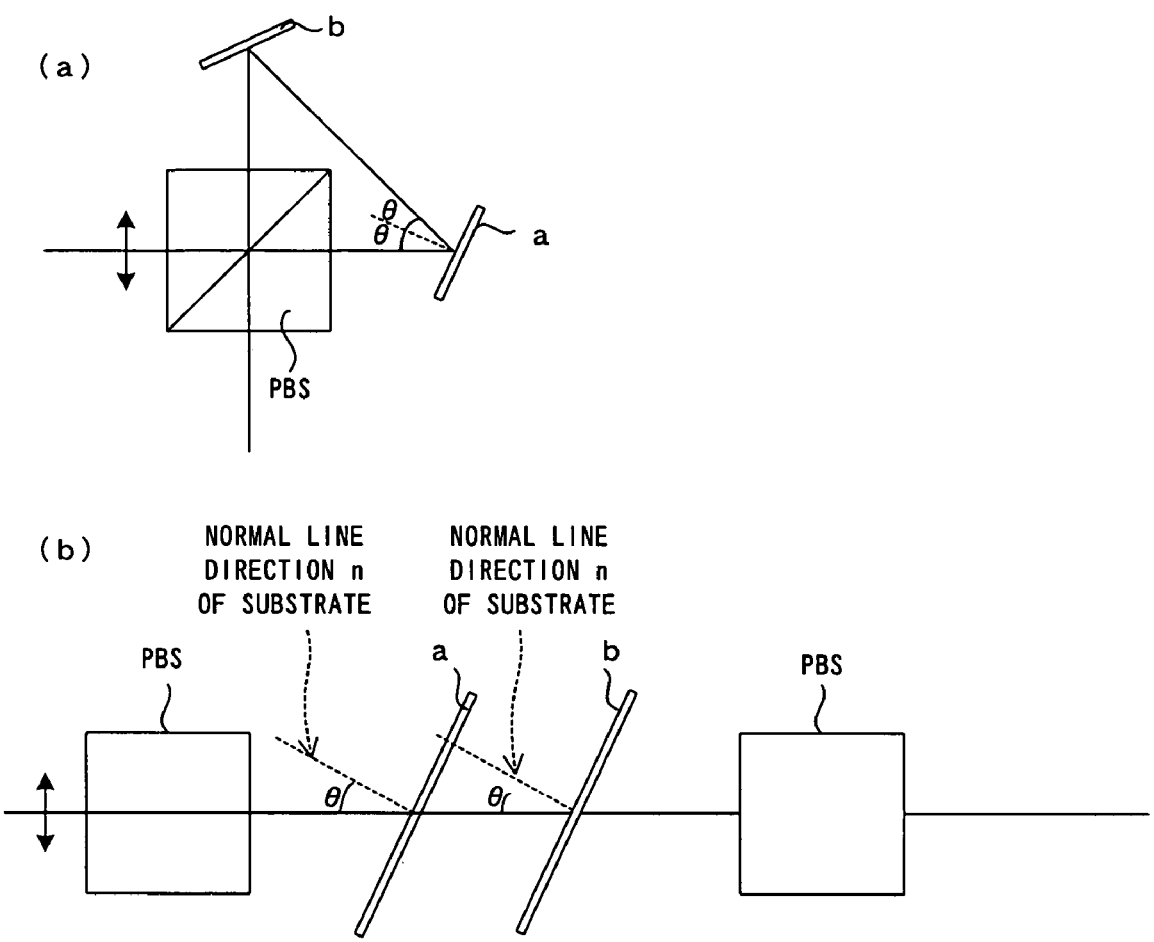
FIG. 21 is a diagram showing an equivalent optical path for explaining how a liquid crystal cell compensates for the residual birefringence compensation of a light.
Figure 22:
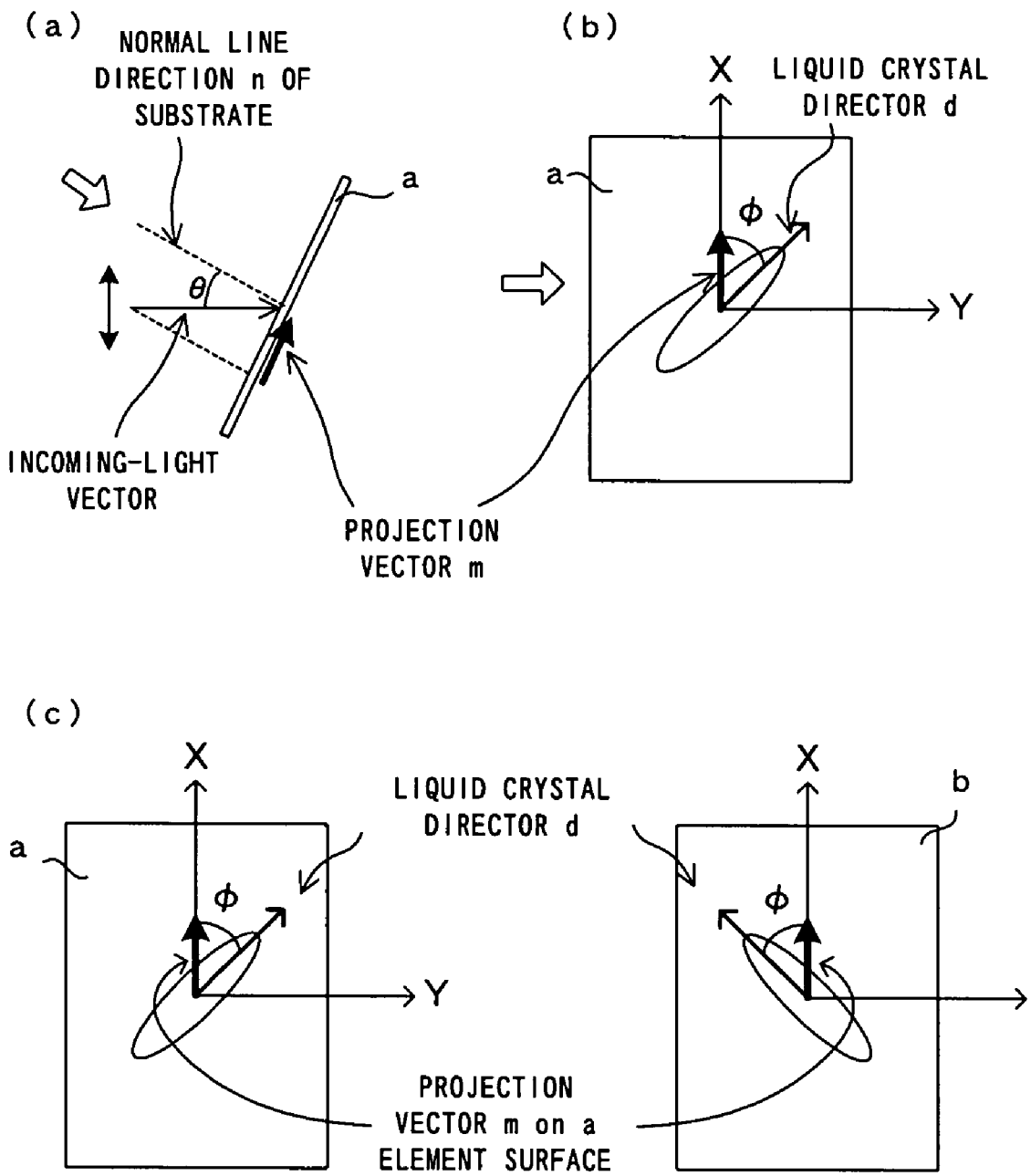
FIG. 22 is a diagram showing how a liquid crystal cell compensates for the residual birefringence compensation of a light.
Figure 23:
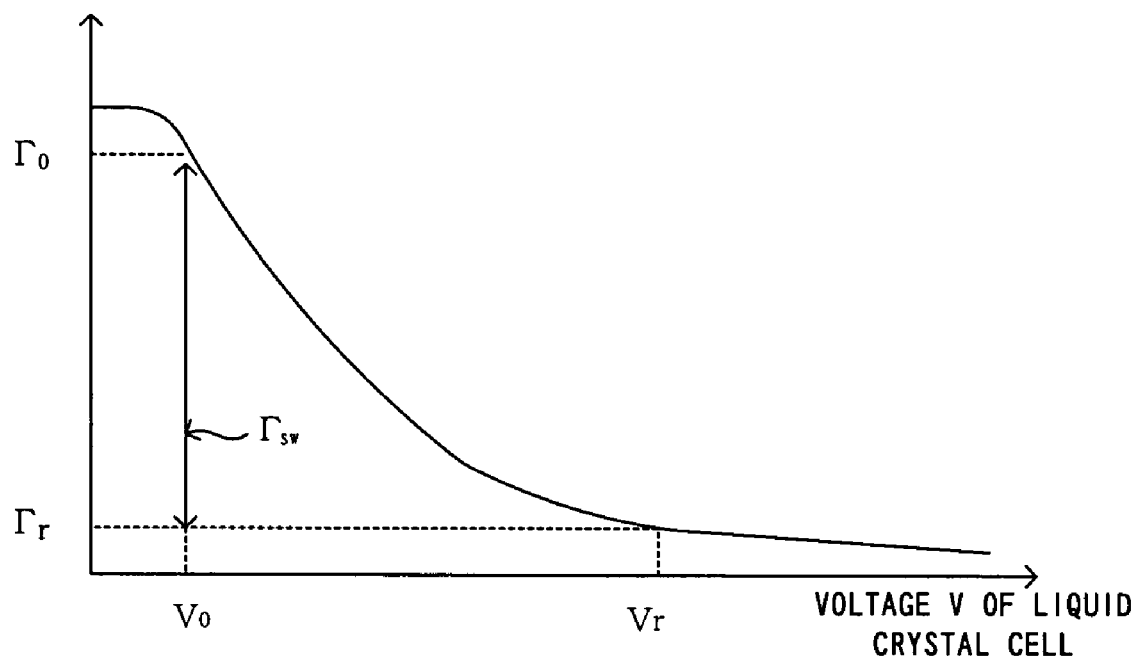
FIG. 23 is a diagram showing the characteristics of residual birefringence for explaining how a liquid crystal cell compensates for the residual birefringence of a light.

A liquid crystal cell used in the optical switch of the present invention can be used for the residual birefringence compensation of the liquid crystal cell. With reference to FIG. 21 to FIG. 23, how a liquid crystal cell compensates for the residual birefringence of a light will be described.

Because the optical path is mirror-symmetrical with respect to the light reflector in the basic configuration of the optical switch of the present invention shown in FIG. 21(a), the optical path can be indicated by expanding it equivalently along the optical path as shown in FIG. 21(b). In the figure, a and b each indicate a liquid crystal cell. Because a light enters the liquid crystal cell at an angle (θ in the figure), the optical path is at an angle of θ with the normal line of the liquid crystal cells a and b as shown in FIG. (b).

FIGS. 22(a) and 22(b) show the relation between the incoming-light vector for the liquid crystal cell a and the projection vector m of this incoming-light vector for the surface of the liquid crystal cell a. FIG. 22(b) is a diagram viewed from the normal line direction n (white arrow direction in FIG. 22(a)). When the angle between the projection vector m and the direct direction of the liquid crystal cell is φ, the residual birefringence (retardation) of the liquid crystal is expressed as follows:

$$G=(2\pi d/\lambda)\cdot[ne\cdot\sqrt{(1-(\sin^2\theta\cdot\sin^2\phi/ne^2)-(\sin^2\theta\cdot\cos^2\phi/no^2))}-\sqrt{(1-(\sin^2\theta/no^2))}]$$

where, G is the residual birefringence, d is the cell gap, ne is the abnormal light refraction index, and no is the ordinary light refraction index. For the expression of the residual birefringence G described above, see Pochi Yeh and Claire Gu. "Optics of Liquid Crystal Displays", p. 155, (1999), John Wiley £ Sons, Inc. In the expression described above, because θ=0 when a light enters vertically, G=2π/λ·d(ne−no)

Therefore, for a liquid crystal cell used for switching according to the present invention, the cell gap d is defined so that G is a predetermined value of λ/4 (or a predetermined value of λ/8, λ/10, etc.) under a skewed light condition.

A liquid crystal cell used for residual birefringence compensation according to the present invention compensates for a residual birefringence by maintaining a 90-degree relation between the liquid crystal director direction of the liquid crystal cell for residual birefringence compensation and the liquid crystal director direction of the liquid crystal cell used for switching as shown in FIG. 22(c).

The residual birefringence compensation by a liquid crystal cell for residual birefringence compensation according to the present invention will be described below with reference to the concept diagram in FIG. 23 showing the relation between the voltage applied to the liquid crystal cell and the residual birefringence characteristics.

To make the residual birefringence G closer to 0 in the relation between the voltage applied to the liquid crystal cell and the residual birefringence characteristics shown in FIG. 23, it is necessary to apply the voltage of one hundred and several dozens [V] to the liquid crystal cell.

To satisfy this requirement, the liquid crystal director direction of the liquid crystal cell for switching and the liquid crystal director direction of the liquid crystal cell for residual birefringence compensation are set at aright angle to each other. In FIG. 22, it is assumed that p-polarized light vibrates in the X-Z axis plane.

Three methods for compensating for residual birefringence will be described below.

In the first method, a continuous voltage Vr is applied to the liquid crystal cell for double refraction compensation. At this time, the residual birefringence of the liquid crystal cell for double refraction compensation is expressed as G=Gr. When the same voltage Vr is applied to the liquid crystal cell for switching, the amount of double refraction is Grand, because the director directions of the two liquid crystal cells are at a right angle to each other, the double refraction of the two liquid crystal cells nullifies each other and the residual birefringence becomes 0. At this time, because the light that reflects on the liquid crystal cell for switching and on the liquid crystal cell for residual birefringence compensation is not collectively subject to modulation, the incoming p-polarized light remains a p-polarized light.

Next, when a small voltage Vo is applied only to the liquid crystal cell for switching, the composite residual birefringence of the liquid crystal cell for switching and the liquid crystal cell for residual birefringence compensation is expressed as follow.

$$Go-Gr=Gsw$$

Changing this Gsw to λ/2 can change the p-polarized light to the s-polarized light and therefore can change the optical path.

In the second method, a continuous voltage Vo is applied to the liquid crystal cell for residual birefringence compensation and Vo is applied to the liquid crystal cell for switching to cancel Go. When Vr is applied to the liquid crystal cell for switching, the composite residual birefringence after passing through the two liquid crystal cells is expressed as follows.

$$Go-Gr=Gsw$$

Changing this Gsw to λ/2 can change the p-polarized light to the s-polarized light and therefore can change the optical path.

In the third method, a double refraction crystal or an isotropic film is placed in any given location in the optical path instead of using the liquid crystal cell for residual birefringence compensation in order to create a continuous Gr (or Go) for compensating the residual birefringence. The light is switched by the liquid crystal cell for switching.

Figure 24:
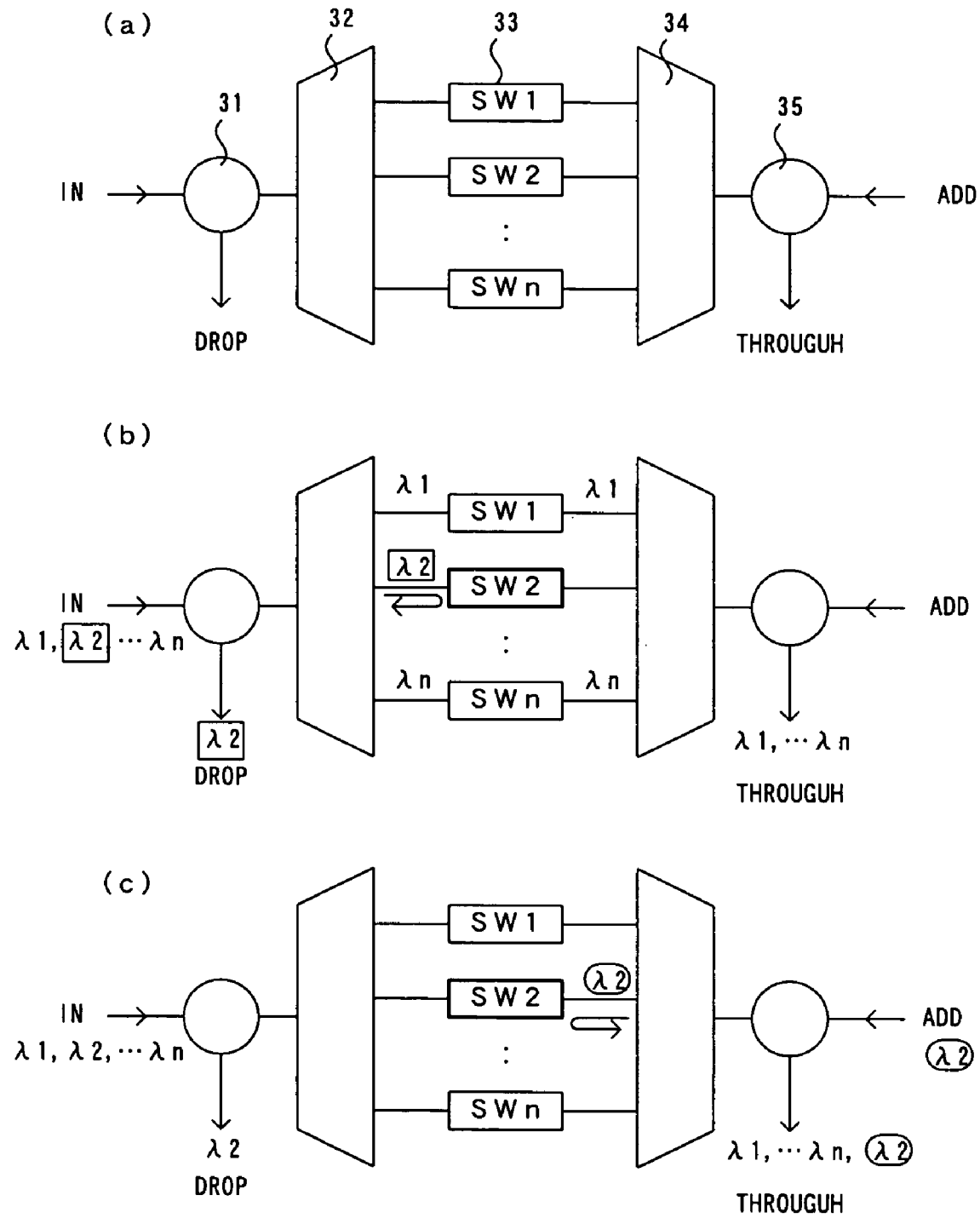
FIG. 24 is a diagram showing an example of the configuration of the optical switch of the present invention.
Figure 25:
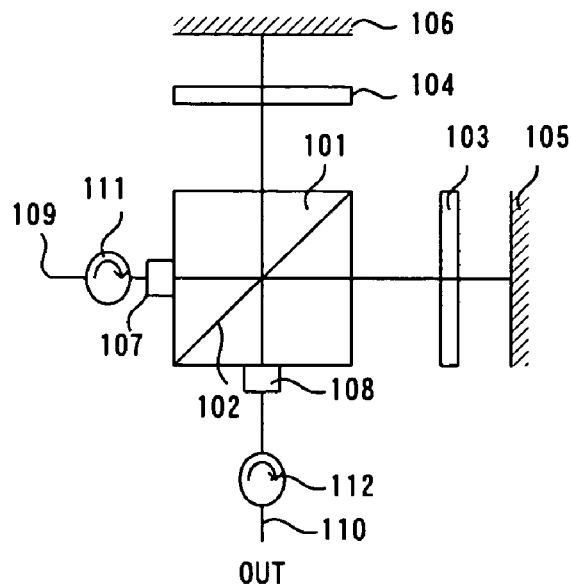
FIG. 25 is a diagram showing an example of a 2×2 optical changeover switch in the conventional configuration in which incoming and outgoing ends are provided at a right angle.
Figure 25:
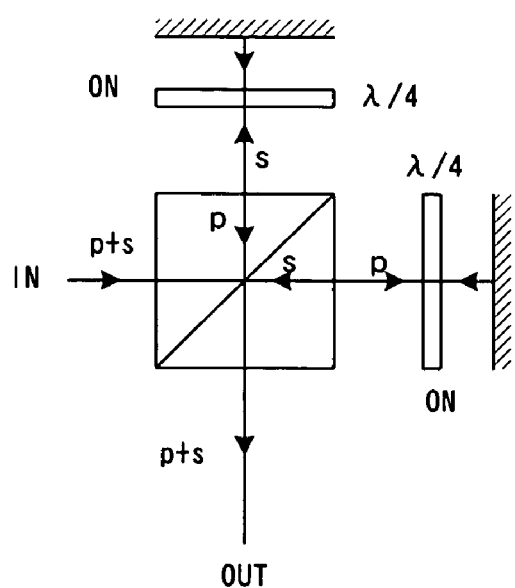
Figure 25:
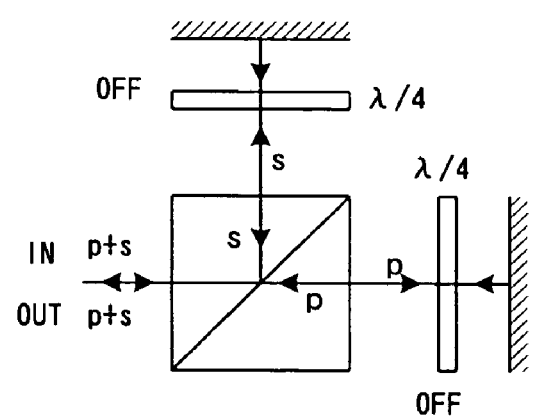

FIG. 24 shows an example of the configuration including an add/drop using the optical switch according to the present invention.

The configuration example in FIG. 24 comprises a circulator 31, an optical multiplexer/demultiplexer 32, optical switches33 (SW1–SWn) according to the present invention, an optical multiplexer/demultiplexer 34, and a circulator 35, all of which are connected. In FIG. 24(a), one end of the circulator 31 not connected to the optical multiplexer/demultiplexer 32 is an input end and the other end is a drop end, and one end of the circulator 35 not connected to the optical multiplexer/demultiplexer 34 is an input end and the other end is a drop end.

The following describes an example of the configuration in which optical switches SW1–SWn are made to correspond to λ1 to λn, respectively, with signals, λ1 to λn, entered from the input end. The signals, λ1 to λn, entered from the input end are demultiplexed by the optical multiplexer/demultiplexer 32 into signals with each wavelength. When only SW2 of an optical switch 33 is switched as shown in FIG. 24(b), the signal with the wavelength of λ2 is output from the drop end of the circulator 31 with the remaining signals with the wavelengths of λ1 and λ3–λn output from the through end of the circulator 35. At this time, when λ2 is entered from the ADD end as shown in FIG. 24(c), the entered signal with the wavelength of λ2 is output from the through end of the circulator 31.

The arrangement of the circulators, optical multiplexer/demultiplexers, and optical switches in this configuration example is the same as that described in Optical Engineering, Vol. 40 No. 8, 1521–1528, August 2001 (Sarun Sumriddetchakajorn, Nabeel A.Riza, Deepak K.Sengupta) described above.

As is apparent from the above description, the optical switch according to the present invention makes the optical path length and the optical characteristics equal among polarized lights passing through different paths, thus eliminating the need for the optical path length and the optical characteristics to be adjusted. In addition, the optical switch reduces a signal deterioration caused by polarized mode dispersion.

In addition, reducing the number of times a signal passes through the electrodes of a liquid crystal cell makes it possible to reduce the cost by creating a configuration in which the polarization dependent loss is reduced and the number of parts and the adjustment points is decreased or reduced.

In addition, the configuration improves the response of a liquid crystal cell to allow the optical switch to operate more quickly.

It should be noted that the scope of the present invention is not limited to the apparatus described above but that the optical switch may also be used as a component part of an optical cross-connect.

INDUSTRIAL APPLICABILITY

The optical switch according to the present invention is useful as an optical switch or a component part of an optical cross-connect that switches between the incoming light and the outgoing light in the configuration of an optical network in the optical communication field.

The optical switch according to the present invention can be used to compensate for a residual birefringence or a temperature or can be used as an attenuator by controlling the polarization state.

The invention claimed is:

1. An optical switch comprising
polarized light separation/combination means;
at least two reflection means; and
polarization control means for controlling a polarization direction, wherein said polarized light separation/combination means and said reflection means are arranged so that two polarization components, separated by said polarized light separation/combination means, travel along the same optical path but into different traveling directions, re-enter said polarized light separation/combination means, and are combined therein and, at the same time, said polarization control means is placed in the optical path to cause said polarization control means to control the polarization direction of each polarization component,
wherein said polarization control means is configured by a liquid crystal cell and said liquid crystal cell has a light reflector and constitutes said reflection means.

2. The optical switch according to claim 1 wherein said polarization control means, placed in the optical path, performs polarization control of a total of λ/2 wavelength in the optical path.

3. The optical switch according to claim 1 wherein a polygon, formed by the optical path formed by said reflection means and said polarized light separation/combination means, has a right angle at an interior angle corresponding to said polarized light separation/combination means and an angle calculated by multiplying a number of reflection means minus 1 multiplied by 180 degrees equals a sum of the interior angles of the polygon.

4. The optical switch according to claim 3 wherein said reflection means comprise two light reflectors placed symmetrically with respect to said polarized light separation/combination means so that an incoming angle and an outgoing angle of the polarization component become 22.5 degrees.

5. The optical switch according to claim 2 wherein said polarization control means, which performs polarization control of λ/4 wavelength, is placed in the optical path in front of one of light reflectors of said reflection means.

6. The optical switch according to claim 2 wherein said polarization control means, which performs polarization control of λ/8 wavelength, is placed in the optical path in front of both light reflectors of said reflection means.

7. The optical switch according to claim 3 wherein said reflection means comprises two light reflectors placed symmetrically with respect to said polarized light separation/combination means so that an incoming angle and an outgoing angle of a polarization component become 45 degrees; and one light reflector which is in an optical path connecting said two light reflectors and which is placed vertically to said light reflectors.

8. The optical switch according to claim 7 wherein polarization control means that performs polarization control of λ/4 waveform is placed in the optical path in front of one of said three light reflectors.

9. The optical switch according to claim 7 wherein polarization control means that performs polarization control of λ/8 waveform is placed in the optical path in front of two of said three light reflectors.

10. The optical switch according to claim 7 wherein polarization control means that performs polarization control of λ/12 waveform is placed in the optical path in front of said three light reflectors.

11. The optical switch according to claim 2 wherein said reflection means comprises two light reflectors placed symmetrically with respect to said polarized light separation/combination means so that an incoming angle and an outgoing angle of a polarization component become 22.5 degrees and wherein polarization control means that performs polarization control of λ/2 wavelength is placed in the optical path between said two light reflectors.

12. The optical switch according to claim 2 wherein said reflection means comprises two light reflectors placed symmetrically with respect to said polarized light separation/combination means so that an incoming angle and an outgoing angle of a polarization component become 22.5 degrees, wherein the polarization control means that performs polarization control of λ/10 wavelength is placed in the optical path in front of the two light reflectors, and wherein another polarization control means that performs polarization control of λ/10 wavelength is placed in the optical path between said two polarization control means.

13. The optical switch according to claim 2 wherein said liquid crystal cell includes a liquid crystal cell for switching and a liquid crystal cell for residual birefringence compensation.

14. The optical switch according to claim 13 wherein a director direction of said liquid crystal cell for residual birefringence compensation is at a right angle to a director direction of said liquid crystal cell for switching and wherein a voltage is applied to compensate for a residual birefringence of said liquid crystal cell for switching.

15. The optical switch according to claim 1, wherein said light reflector is placed inside the liquid crystal cell.

16. The optical switch according to claim 15 wherein said light reflector constitutes one of two electrodes provided on the liquid crystal cell.

17. The optical switch according to claim 1, wherein said light reflector is placed outside the liquid crystal cell.

18. An optical switch wherein an input/output port is placed at both ends of an optical path of the optical switch according to claim 1 with an optical axis adjusted and a circulator is connected to the input/output port to constitute a 2-input/2-output switch.

19. An optical switch wherein two input/output ports are placed at both ends of an optical path of the optical switch according to claim 1 symmetrically with respect to an optical center of the optical path, with an optical axis adjusted, to constitute a 2-input/2-output switch.

* * * * *